US011640157B2

(12) United States Patent
Drouillard

(10) Patent No.: US 11,640,157 B2
(45) Date of Patent: *May 2, 2023

(54) NETWORKED SYSTEM FOR COORDINATED LASER LABELLING OF CONVEYED FOOD PRODUCTS

(71) Applicant: NLL, LLC, Vero Beach, FL (US)

(72) Inventor: Gregory P. Drouillard, Vero Beach, FL (US)

(73) Assignee: NLL, LLC, Vero Beach, FL (US)

(*) Notice: Subject to any disclaimer, the term of this patent is extended or adjusted under 35 U.S.C. 154(b) by 208 days.

This patent is subject to a terminal disclaimer.

(21) Appl. No.: 16/565,808

(22) Filed: Sep. 10, 2019

(65) Prior Publication Data

US 2020/0356076 A1 Nov. 12, 2020

Related U.S. Application Data

(63) Continuation of application No. 16/406,855, filed on May 8, 2019, now Pat. No. 10,481,589.

(51) Int. Cl.
*G05B 19/4155* (2006.01)
*B23K 26/362* (2014.01)
*G06F 3/04847* (2022.01)

(52) U.S. Cl.
CPC ........ *G05B 19/4155* (2013.01); *B23K 26/362* (2013.01); *G05B 2219/33198* (2013.01); *G06F 3/04847* (2013.01)

(58) Field of Classification Search
None
See application file for complete search history.

(56) References Cited

U.S. PATENT DOCUMENTS 5,660,747 A * 8/1997 Drouillard ............. B23K 26/08
219/121.69
6,192,053 B1 * 2/2001 Angelico ............ H04W 40/246
370/448

(Continued)

FOREIGN PATENT DOCUMENTS

CN 107984092 A 5/2018
TW 201910037 A * 3/2019

OTHER PUBLICATIONS

Wei et al. "Design of a Communication Interface between the Controller and the Galvanometer", Applied Mechanics and Materials, 2014, vol. 527, p. 269-272.

(Continued)

*Primary Examiner* — Jason Lin
(74) *Attorney, Agent, or Firm* — Cooley LLP

(57) ABSTRACT

A system for coordinated laser marking of mid-conveyance food includes a controller, multiple lasers, and one or more industrial components. The lasers are in network communication with the controller. The controller can send a first instruction set, having a first language, to a first laser, and a second instruction set, having a second language different from the first language, to a second laser, the first laser associated with a first conveyor of multiple conveyors, and the second laser associated with a second conveyor different from the first conveyor. During operation, the first laser applies a marking to a first product as the first product is conveyed along the first conveyor, based on the first instruction set. Also during operation, the second laser applies the marking to a second product as the second product is conveyed along the second conveyor, based on the second instruction set.

19 Claims, 33 Drawing Sheets
(22 of 33 Drawing Sheet(s) Filed in Color)

(56) References Cited

U.S. PATENT DOCUMENTS

| | | | |
|---|---|---|---|
| 6,201,209 B1* | 3/2001 | Llado Abella | B23K 26/02 |
| | | | 219/121.6 |
| 8,121,717 B2 | 2/2012 | Idaka et al. | |
| 8,823,758 B2 | 9/2014 | Chait et al. | |
| 9,144,874 B2 | 9/2015 | Fronius et al. | |
| 9,604,745 B2 | 3/2017 | Goetz | |
| 2003/0186001 A1 | 10/2003 | Khan | |
| 2004/0045204 A1 | 3/2004 | Miano et al. | |
| 2006/0138105 A1* | 6/2006 | Parker | B41J 2/475 |
| | | | 219/121.69 |
| 2006/0262182 A1* | 11/2006 | Robbins | G09F 3/00 |
| | | | 347/257 |
| 2007/0252006 A1 | 11/2007 | Heck et al. | |
| 2007/0289956 A1 | 12/2007 | Knysh et al. | |
| 2008/0223834 A1* | 9/2008 | Griffiths | B23K 26/0006 |
| | | | 219/121.68 |
| 2016/0221699 A1* | 8/2016 | Phillips | H04L 12/66 |

OTHER PUBLICATIONS

International Search Report issued for Application No. PCT/US2020/027951, dated Aug. 7, 2020.
International Preliminary Report on Patentability and Written Opinion issued for PCT/US2020/027951, dated Nov. 2, 2021.

* cited by examiner

Grapefruit
Premier
4288 USA
12345678ABCD

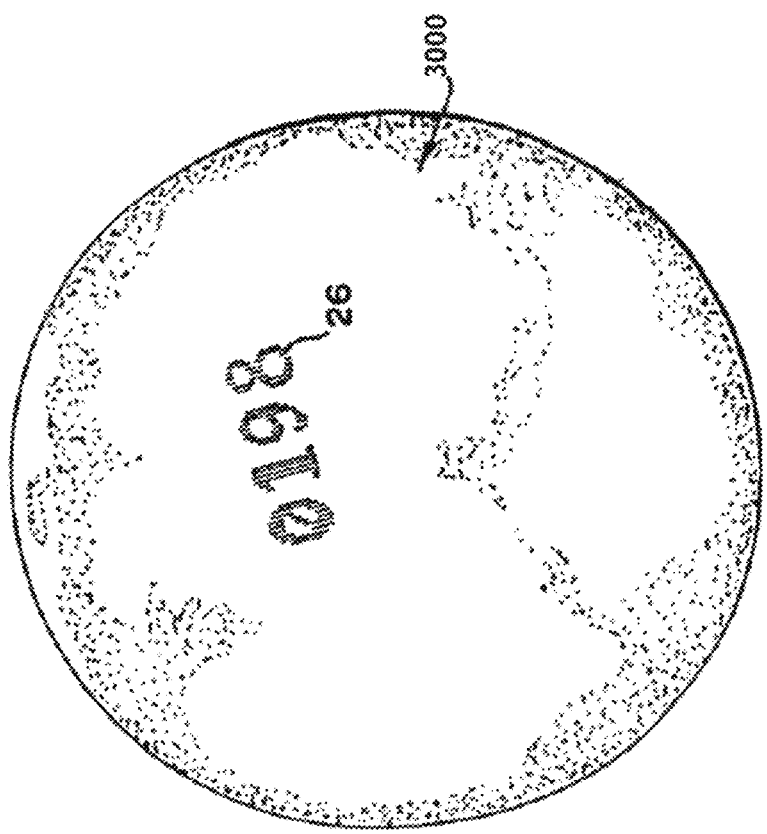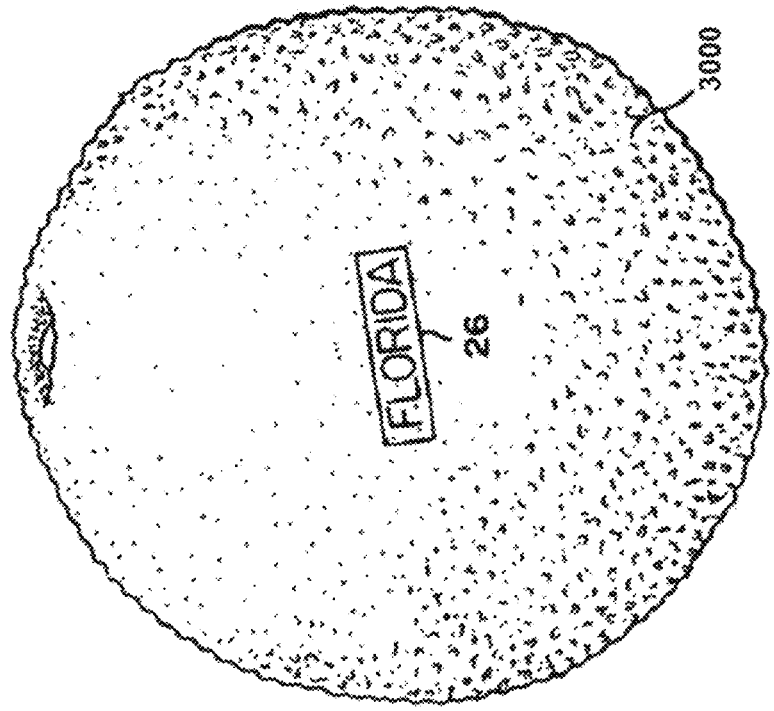
FIG. 29

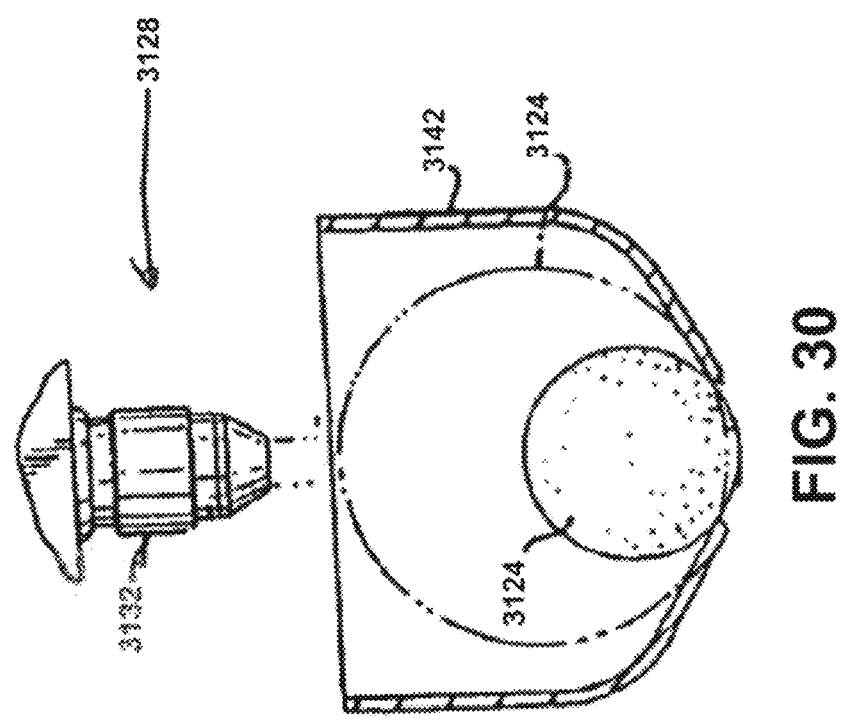

NETWORKED SYSTEM FOR COORDINATED LASER LABELLING OF CONVEYED FOOD PRODUCTS

CROSS-REFERENCE TO RELATED APPLICATIONS

This application is a Continuation of U.S. patent application Ser. No. 16/406,855, filed May 8, 2019 and titled "Networked System for Coordinated Laser Labelling of Conveyed Food Products," the entire contents of which is expressly incorporated by reference herein.

BACKGROUND

Adhesive labels, such as price look-up (PLU) labels, are used in the fresh produce industry for product category management, inventory tracking, and price identification. Such labels can include barcodes, and can convey information such as brand, variety and country of origin.

SUMMARY

A system for coordinated laser marking of mid-conveyance food includes a controller, multiple lasers, and one or more industrial components, according to some embodiments. The controller includes a processor and a memory in operable communication with the processor. The lasers are in network communication with the controller, and each of the lasers is disposed adjacent to an associated conveyor from a plurality of conveyors. The one or more industrial components are associated with the plurality of conveyors, and can include one or more of a sizer, a grader, a sorter, and a conveyor. The controller is configured to send (1) a first instruction set, having a first language, to a first laser from the plurality of lasers, and (2) a second instruction set, having a second language different from the first language, to a second laser from the plurality of lasers, the first laser associated with a first conveyor from the plurality of conveyors, and the second laser associated with a second conveyor from the plurality of conveyors, the second conveyor different from the first conveyor. During operation, the first laser applies a marking to a first product (e.g., a food product) as the first product is conveyed along the first conveyor, based on the first instruction set. Also during operation, the second laser applies the marking to a second product (e.g., a food product) as the second product is conveyed along the second conveyor, based on the second instruction set. A conveyance speed of the first product during operation of the first laser can be different from a conveyance speed of the second product during operation of the second laser.

In some embodiments, the controller receives, from the one or more industrial components, a signal encoding an operational deviation associated with the first conveyor, generates a modified instruction set based on the operational deviation, and sends the modified instruction set to the first laser.

In some embodiments, the modified instruction set is sent to the first laser with a transmission time of between about 35 microseconds (us) and about 53 µs.

In some embodiments, the first instruction set includes instructions for the first laser to apply a predefined label, and the second instruction set includes instructions for the second laser to apply the predefined label. Alternatively or in addition, the first instruction set and/or the second instruction set can specify at least one of: a font size of the marking, a font type of the marking, or a graphic vector property. Alternatively or in addition, the first instruction set and/or the second instruction set can specify at least one of: a blow-off pressure, a blow-off time, a laser fire timing, a laser on time, and a laser off time.

In some implementations, the system also includes a spray head configured to apply a colorant to the marking on the first product after the marking has been applied to the first product. Alternatively or in addition, the system can include a compressed air feed configured to direct air onto the applied colorant after it has been applied to the marking on the first product. Alternatively or in addition, the system can include a sealant dispenser configured to direct sealant onto the applied colorant after it has been applied to the marking on the first product.

A non-transitory, processor-readable medium stores instructions to perform coordinated laser marking of mid-conveyance items (e.g., food), according to some embodiments. Such instructions include instructions to receive, at a processor (e.g., via a graphical user interface (GUI) of the processor), an input associated with a produce lasing variable, and to generate, via the processor, a first instruction set for a first laser head based on the input, the first laser head having a first control language, the first instruction set compatible with the first control language. The instructions also include instructions to generate, via the processor, a second instruction set for a second laser head based on the input, the second laser head having a second control language different from the first control language, the second instruction set compatible with the second control language. The instructions also include instructions to send the first instruction set to the first laser head and to send the second instruction set to the second laser head. The instructions also include instructions to receive, at the processor and from a metrology tool, a measurement signal encoding a measurement (e.g., associated with at least one of a conveyor line speed or a chain stretch); to generate, via the processor and in response to receiving the measurement signal, a modified instruction set based on the measurement signal; and to send the modified instruction set to the first laser head, for replacement, by the first laser head, of the first instruction set with the modified instruction set. At least one of the first instruction set and the modified instruction set includes instructions to impart a marking onto a product (e.g., a fruit).

In some embodiments, the first instruction set includes at least one of: a font size of the marking, a font type of the marking, or a graphic vector property.

In some embodiments, the instructions to generate the modified instruction set include instructions to modify at least one of: a blow-off pressure, a blow-off time, a laser fire timing, a laser on time, and a laser off time.

In some implementations, the instructions include instructions to receive, sequentially at the processor and from the metrology tool, a plurality of measurement signals including the measurement signal, the plurality of measurement signals having an associated sampling rate of at least 100 samples per millimeter of linear conveyor travel (e.g., 121 samples per millimeter of linear conveyor travel).

An apparatus for coordinated laser marking of conveyed items includes a processor and a memory in operable communication with the processor, in accordance with some embodiments. The memory stores instructions to cause the processor to send an associated instruction set from a plurality of instruction sets to each laser from a plurality of lasers. Each instruction set from the plurality of instruction sets includes instructions to lase a predetermined pattern onto food product when the food product is conveyed. The instructions also cause the processor to receive, substantially in real-time, a plurality of measurement signals from each of a plurality of measurement instruments. The plurality of measurement signals can be associated with a single conveyor, a plurality of lanes of a single conveyor, a plurality of conveyors, or a plurality of lanes of a plurality of conveyors. The instructions also cause the processor to calculate, for each instruction set from the plurality of instruction sets and in response to receiving the plurality of measurement signals, an update based on an associated measurement signal from the plurality of measurement signals. The instructions also cause the processor to send, to each laser from the plurality of lasers and during operation of the plurality of lasers, the update for the instruction set of that laser, such that at least one lasing parameter of that laser is adjusted. In some such implementations, each laser from the plurality of lasers is positioned adjacent to a common conveyor lane. In other implementations, each laser from the plurality of lasers is positioned adjacent to a different conveyor from a plurality of conveyors. In still other implementations, each laser from the plurality of lasers is positioned adjacent to a different lane from a conveyor comprising multiple lanes.

In some embodiments, the plurality of measurement signals includes a measurement associated with one of a conveyor line speed, a laser fire timing, a chain stretch, or a size of the food product.

In some embodiments, the plurality of instruction sets is a first plurality of instruction sets, and the memory also stores instructions to cause the processor to receive, via a GUI of the processor, a request to modify the predetermined pattern, to generate a second plurality of instruction sets based on the request to modify the predetermined pattern, and to send, to each laser from the plurality of lasers, an associated instruction set from the second plurality of instruction sets, each instruction set from the second plurality of instruction sets including instructions to lase a modified pattern onto food product while the food product is conveyed.

BRIEF DESCRIPTION OF THE DRAWINGS

The patent or application file contains at least one drawing executed in color. Copies of this patent or patent application publication with color drawings will be provided by Office upon request and payment of the necessary fee.

FIG. 8 is a plan view of a marking that can be applied using a lasing/marking system and/or method of the present disclosure, in accordance with some embodiments.

FIG. 29 is an illustration of example marked food products that can be produced using lasing systems and/or methods of the present disclosure, in accordance with some embodiments.

FIG. 30 is an illustration showing a cross-sectional view of a transfer cup holding an orange and a side elevational view of a laser head compatible for use in lasing/marking systems of the present disclosure, according to some embodiments.

DETAILED DESCRIPTION

Figure 1:
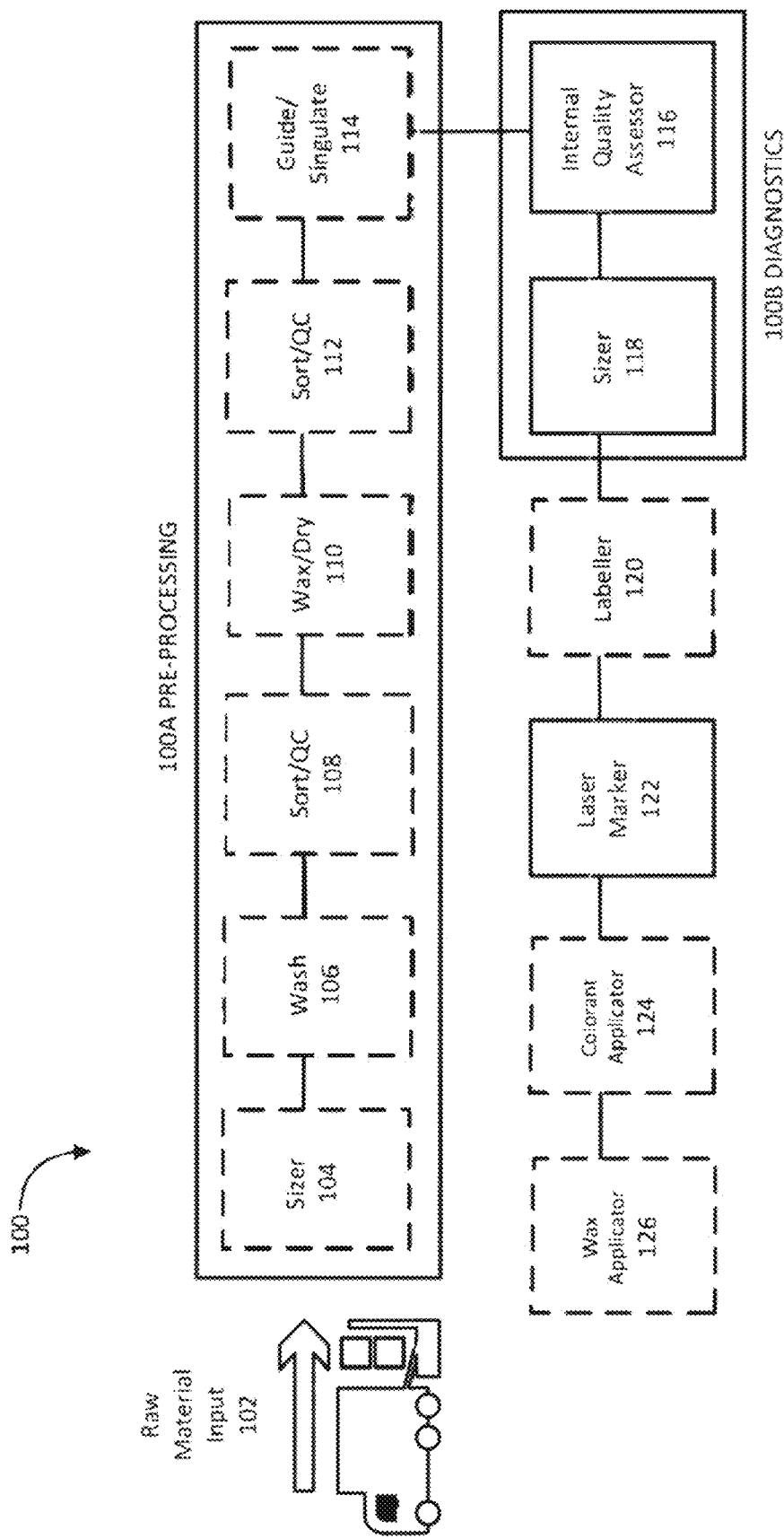
FIG. 1 is a block diagram showing an architecture of an industrial environment, according to some embodiments.

For decades, food products such as fresh produce (fruits and vegetables) have been labelled with small labels (or "stickers") for inventory control and other supply chain functions. Such labels often include identifiers such as a product look-up (PLU) numbers and growth method designations (e.g., conventional, organic, or genetically modified), and are generally composed of micro-thin plastic or vinyl, with an adhesive layer by which they can be affixed to food products. These labels are often non-biodegradable, non-compostable, and can reportedly contain one or more of: turpentine, petroleum, and urea-formaldehyde resins. Moreover, during operation of a production line (e.g., a produce packing line), label applicators can exhibit relatively high failure rates (e.g., non-adhered/dropped labels), for example as high as 30%, resulting in the accumulation of dropped labels at the bottom of conveyor lanes of the packing line. These accumulated labels can impede the transport of products that are being directed along their path, and can raise hygiene issues. In addition, labels are typically applied through incidental mechanical contact between the conveyed product and a spool of identical labels of that type. Although multiple label spools can be positioned along a common conveyor lane, if a need arises to use a label not already positioned on that line, production must be halted (or the change anticipated far enough in advance) so that at least one of the label spools can be manually changed out.

Another known method for marking produce is direct marking with an ink jet printer, using edible ink. Ink-based marking systems require the use of water-soluble, FDA-approved inks. Such inks, however, are typically susceptible to smudging during handling and/or "sweating off" as a result of applied and/or natural waxes of the produce (e.g., exacerbated by temperature and humidity changes) as the produce moves through the supply chain.

Kingmilan and Lotus Laser Systems have demonstrated carbon dioxide ($CO_2$) laser engraving of fruit. These and similar systems, however, are configured to apply the laser engraving in an isolated step while the fruit is stationary (i.e., is not being conveyed or otherwise transported), using a static photocell to trigger a lasing event, and at speeds that are too slow for production operations (e.g., 1.27-1.46 seconds for a single marking). Moreover, known laser marking systems apply their markings via burning, charring or otherwise destructively altering the surface of the laser treated item, resulting in an undesirable appearance.

The present disclosure sets forth systems and methods that overcome the challenges described above, and facilitate the coordinated, production-speed laser marking ("lasing") of products such as produce, as the products are being conveyed. The laser marking includes the application of laser energy (e.g., using a carbon dioxide (CO2) laser) to a surface of the mid-conveyance product such that the laser energy penetrates to a sufficient depth of a skin or outer layer of the product, and with sufficient characteristics, to cause the removal (e.g., via vaporization) of pigment from the skin/outer layer of the product, in a desired pattern, without burning or charring. Foodstuff products for laser marking vary considerably, for example from products such as onions, having very thin outer layers (e.g., 11 micrometer-thick outer layers/skins) to products such as melons, having much thicker outer layers (e.g., 105 micrometer-thick skins). Depending upon where, within this range of product outer layer characteristics, a product lies, any of a variety of suitable penetration depths for laser impact of a pigment layer thereof can be targeted (e.g., onion, 3 cell layers (about 3 micrometers); tomato (about 7 micrometers); citrus (about 9 micrometers); and melons (2-3 cell layers, about 19-21 micrometers)). Laser markings are a much more versatile marking technique than adhesive sticker systems, since they can be dynamically changed "on the fly" via a user interface, and constitute a "green" technology, in that they consume no raw materials and produce essentially no waste. Moreover, laser markings are more secure and difficult to counterfeit, as compared with physical labels, which can be easily changed/swapped out.

The laser marking is performed by one or more lasers under the control of a master controller that can generate instruction sets and that dynamically adjusts to a wide variety of data inputs received from industrial equipment that is part of the production/packing line. For example, if a sizer upstream from the laser determines that a first orange being conveyed down lane 1 has a grade of "A," and that a second orange being conveyed down lane 1 has a grade of "B," the grade data and associated position data of the associated products can be transmitted, e.g., via a wired network, to a master controller for/or the laser, which modifies an instruction set such that when the first orange arrives at the laser, the laser marking will include the text "Grade A," and when the second orange arrives at the laser, the laser marking will include the text "Grade B."

Systems described herein can apply laser markings to produce or other products, as they are conveyed, at a rate of up to 10 products per second (e.g., 10 pieces of fruit per second). In some embodiments, a system of the present disclosure does not include a wireless transmitter or transceiver, and/or is otherwise inhibited/prevented from wireless communication. https://www.ams.usda.gov/grades-standards Grades and Standards: The USDA grade shields, official seals and labels are reputable symbols of the quality and integrity of American agricultural products. Large-volume buyers such as grocery stores, military institutions, restaurants, and even foreign governments use the quality grades as a common "language," making business transactions easier. The USDA shields and labels assure consumers that the products they buy have gone through a rigorous review process by highly-skilled graders and auditors that follow the official grade standards and process standards developed, maintained and interpreted by USDA's Agricultural Marketing Service. Markings applied by embodiments of the present disclosure can include such shields, seals and/or labels.

Lasers of the present disclosure (also referred to herein as "laser markers" or "natural light labellers" (NLLs)) can be positioned one-to-a-lane, multiple-to-a-line, or arrayed as multiple lasers per lane and across multiple lanes of a conveyor system, such that products travelling down one or more of the conveyor lanes can be lased at different times and/or with different predetermined patterns. For any given laser of the systems described herein, the laser marking pattern applied to a first product can be completely different from the laser marking pattern applied to a second product immediately subsequent to the first product in the conveyor lane. Laser marking systems of the present disclosure can be configured to apply laser markings to, for example, up to 8 products per second, or to about 8 products per second, or to up to 9 products per second, or to about 9 products per second, or to up to 10 products per second, or to about 10 products per second, or to between 8 and 10 products per second. The speed at which produce items can be laser marked can be defined, at least in part, by the conveyor speed of the product, a feature which allows the present technology to operate without compromising an active packing line. In addition, the size of the product being marked (referred to as the "pitch" of the product cup), and the density of information being marked can also influence the limit of speed of marking. For example, watermelon conveyors typically include a 36" pitch, and the resulting product movement is about 5.5 per second at the typical conveyor speed for melons. Cherries, on the other hand, are typically conveyed on 1" pitch cups, and the typical product movement is about 30 per second. Other examples within this range are apples at about 10 per second, and citrus fruit at about 9 to about 14 fruit per second, depending upon the particular variety (e.g., lemon, orange, grapefruit, etc.), and cherry tomatoes at about 22 per second.

FIG. 1 is a block diagram showing an architecture of an industrial environment (specifically, a produce packing line), according to some embodiments. As shown in FIG. 1, the produce packing line 100 receives a raw material input 102 (e.g., a quantity of unprocessed fruit, also referred to herein as "products"), optionally performs pre-processing steps (within the pre-processing section 100A) on the raw material to form processed products, runs diagnostics on the products or processed products (within the diagnostics section 100B), and applies one or more identifying markings and/or labels to the products or processed products prior to routing them (e.g., in an automated fashion) for placement into packages such as cartons, boxes and/or bags. The raw material input is transported (e.g., conveyed by a conveyor, which may include multiple lanes, belts, or chains, with each lane optionally including a sequence of cups or other receptacles/positioners, etc.) through the produce packing line 100 along the direction indicated by the arrow in FIG. 1. The center-on-center "pitch" of a conveyed product is determined by the cup size (e.g., diameter, width, length, or other linear dimension) associated with a conveyor lane. Example cup diameters include, for example, 3", 3.25", 3.5", 3.75", 4.0" etc. If the pitch is 3.5", a conveyor running at 8 cups per second (cps) has a linear line speed of 140 feet per minute (fpm), whereas if the pitch is 4.0" and the conveyor is running at 8 cps, the line speed would be 160 fpm.

The pre-processing section 100A of the product packing line 100 includes one or more of the following, in any combination and sequencing: a sizer 104 (also referred to herein as "sizer electronics"), a washing station 106, a sorting and/or quality control (QC) section 108, a wax application and drying station 110, a further sorting and/or QC section 112, and singulating guides 114. The sizer 104 (also referred to herein as a "grader," as it can be used to assess the raw material input (or processed products) and assign a "grade" classification thereto) can include any of a wide variety of fruit and/or vegetable sizing, grading and/or sorting equipment, both mechanical and electronic, which can include, but is not limited to: roller sizers, roll sizers, fruit sizers, grape sizers, belts, grommets, etc. The sizer 104 can automatically detect one or more properties of the raw material input or processed products, e.g., according to a sorting program or recipe, which may be operator/user-defined or adjusted. The properties detectable by the sizer 104 can include any combination of the following non-exhaustive list of properties, which can be specific to produce type (and which can be classified according to the cause): shape (ranging from normal shape for the product and variations therefrom); physical blemishes such as windscar, chafing, flat spots, and irregular color or maturity; disease spotting, cankers or lesions associated with fungal or bacterial pathogens, and post-harvest injury (e.g., bruising, temperature abuse in storage, chemical burn, etc.). A range of sizer types and manufacturers are available for use in packing operations, and each model has unique defined metrics to capture defect type, defect size, defect quantity, defect location, defect depth, defect radius/dimension, dimensions (e.g., average diameter, maximum diameter, minimum diameter, average height, maximum height, minimum height), as well as the normal range of product weight, grade, volumetric size, color, brightness, surface reflectivity, internal quality, external quality, etc. While each sizer manufacturer or model assesses product characteristics using different methods or metrics, the output from these sizers can be incorporated into and contribute to the grade output, along with color, size, shape, etc. for labelling, sorting and packing purposes. Examples of blemishes or defects that can be detected by the sizer 104 include browning, water core, rot(s), wind damage, disease lesions and spots, and mechanical injury. Additional examples can be accessed, by way of example, at https://mafindustries.com/internal-defects/, https://ellips.com/fruit-grading/, and http://www.compacsort.com/en/technology/sorting-and-grading/. The detected data can be stored locally within the sizer 104, queried by a remote compute device and/or transmitted as sizer data from the sizer 104 to another compute device in network communication with the sizer 104 (e.g., with laser marker(s) 122, discussed below). In some embodiments, the sizer 104 is an electro-optical system with user-configurable settings and features, and includes a camera and lighting. The sizer 104 optionally includes a load cell and/or a scale for weighing products as they are conveyed therethrough. Although the data detected by the sizer 104 includes data specific to each individual product that is conveyed through the product packing line 100, in some implementations, the sizer 104 is configured to generate lot descriptive data (e.g., size or color distribution curves/plots per orchard or variety) and/or lot comparative data (e.g., relative defect count for one orchard or variety as compared with another) based on the detected data. In some embodiments, the sizer 104 determines (e.g., calculates) a grade for an individual product (e.g., for an individual piece of fruit) based on one or more of the detected data associated with that product, such as color, size, blemishes, defect quantity, etc.

The diagnostics section 100B of the produce packing line 100 includes an internal quality assessor 116 and a sizer 118. Although the internal quality assessor 116 and the sizer 118 are depicted in FIG. 1 as being separate stations/components of the produce packing line 100, in some implementations, the internal quality assessor 116 is part of the sizer 118, or the internal quality assessor 116 and the sizer 118 functionalities are co-located within a common machine or housing. Internal quality assessor 116 can include one or more of a variety of fruit and vegetable assessment tools including, but not limited to: infrared (IR) transmission scanners, near-infrared (NIR) transmission scanners (e.g., Compaq's Inspectra system), optical imagers with sensors and cameras (e.g., Compaq's Spectrim and Invision systems), terahertz (THz) transmission tools, laser graders, etc. The properties detectable by the internal quality assessor 116 can include any combination of the following non-exhaustive list of properties: ripeness, juiciness, firmness, physiological maturity, moisture content, sugar content, solids content, morphology/density/shape of a core (e.g., an apple core), acid content, soluble solids content, desiccation (e.g., due to broken vesicles from freezing), blemishes, defect density, defect type, defect location, defect size, defect count, defect depth, etc. Examples of blemishes or defects that can be detected by the internal quality assessor 116 include core rot, irregular ripening, bruising, etc. The internal quality assessor 116 can be a non-contact, non-destructive and/or non-immersion-based diagnostic tool.

Subsequent to the pre-processing section 100A and the diagnostics section 100B are an optional labeller 120 (or plurality/array of labellers), a laser marker (or plurality of laser markers) 122, optionally one or more colorant applicators 124, and optionally one or more wax applicators 126 (e.g., followed by a dryer or blow-off station). The labeller 120 represents one or more known spools of adhesive-backed stickers designed for mechanical (e.g., friction-assisted) application/placement onto product surfaces as they are conveyed beneath the spool. Labellers 120 are typically controllable as dedicated applicators that dispense a physical sticker in response to a "high"-valued control signal (e.g., "1"), and otherwise do not dispense (e.g., in response to a control signal of "0"). When configured to include both a labeller 120 and a laser marker 122, each system responds to the product information signal through its own controller, and the two are not integrated in a single, common controller. Alternatively, in some implementations, no labeller is included in the product packing line 100, since the laser marker(s) 122 can impart the same data as the labeller, but in less time (i.e., more efficiently), without the addition of any material to the conveyed product, and since the laser markings can be dynamically changed, mid-run without the need to manually swap out label spool(s). In some embodiments, subsequent to the laser marking being applied, via laser marker 122, to a conveyed product, a colorant can be applied, via the colorant applicator 124, to the lased/patterned surface of the product. Whether or not colorant is applied to the lased/patterned surface, a wax can be applied to the lased/patterned surface, via a wax applicator 126, to re-seal the lased surface of the product.

Figure 2A:
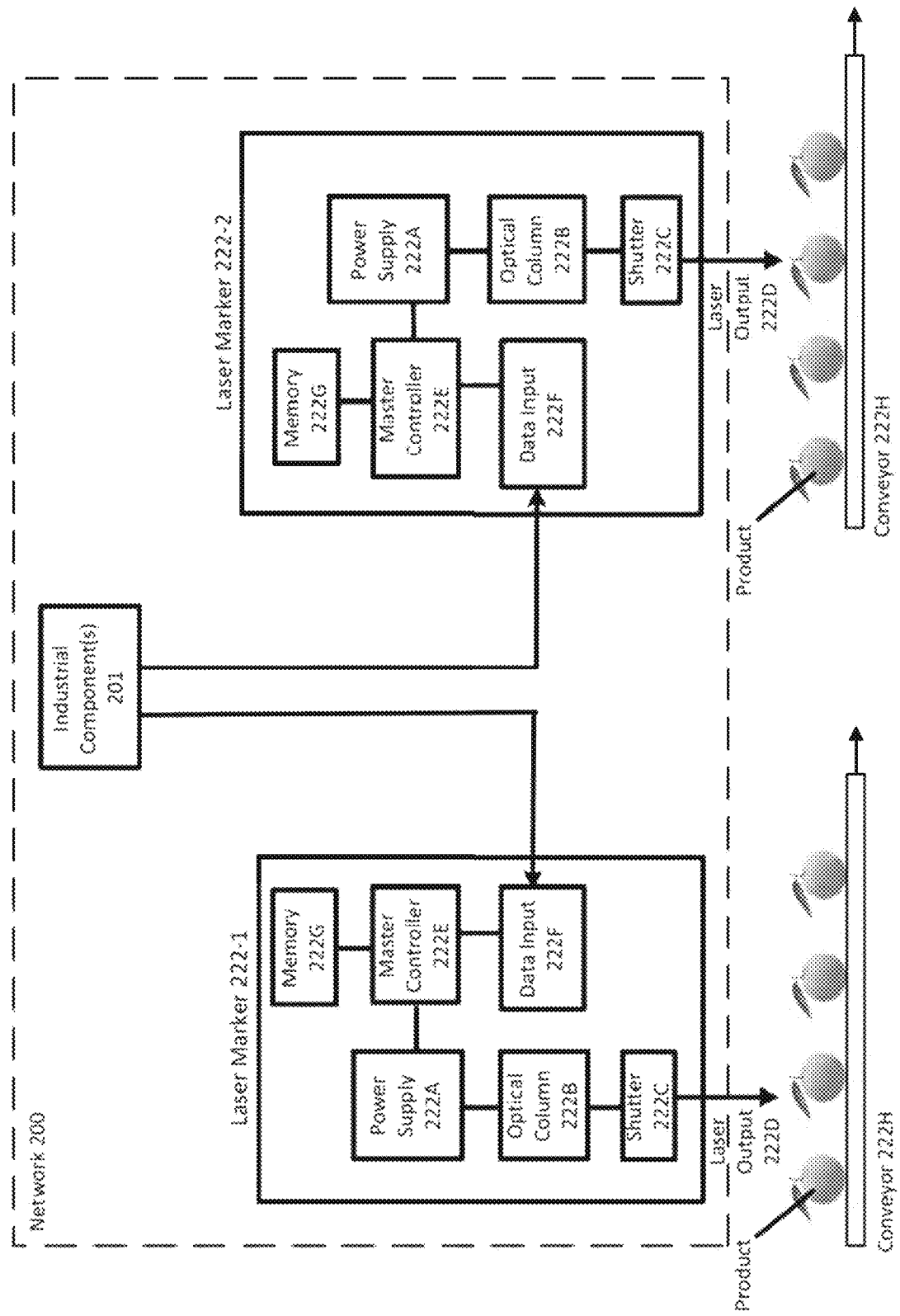
FIG. 2A is a block diagram showing laser markers in operable communication with industrial components, according to some embodiments.

FIG. 2A is a block diagram showing laser markers in operable communication with industrial components, according to some embodiments. As shown in FIG. 2A, each laser marker (222-1, 222-2) includes a power supply 222A, an optical column 222B, a shutter 222C aligned with the optical column 222B, a master controller 222E operably coupled to the power supply 222A, a memory 222G operatively coupled to the master controller 22E, and a data input 222F operatively coupled to the master controller 222E. The master controller 222E can include or communicate with a programmable logic controller (PLC). The data input 222F can include one or more of: a data port, a wired data connection, an optical cable connection, and a wireless receiver/transceiver. The master controller 222E can be configured to receive, and to act on, analog signals and/or digital signals. Each laser marker 222-1, 222-2 can receive, via its associated data input 222F, data packets from one or more industrial components 201. As used herein, an "industrial component" refers to any piece of equipment used in an industrial setting. For example, the one or more industrial components can include, but are not limited to, one or more: sizers, graders, internal quality assessors, conveyor shaft sensors, shaft encoders (e.g., 540 pulses per millimeter), slot/cup sensors, PLCs or any combination of any of the foregoing and/or any other components that can send signals (e.g., 4-20 milliamp signals or 0-24 volt signals) to the master controller. The memory 222G can store instructions/recipes for operating the laser marker's power supply 222A to cause a predetermined desired pattern to be lased (via the laser output 222D), for example using a galvanometer to steer the laser beam in x and y directions, onto a surface of a product that is disposed and conveyed beneath the laser markers (222-1, 222-2). The lased pattern can be confined to a "window" area having a size that can depend on one or more of: the conveying speed (i.e., the speed of the conveyor), the type of product being laser marked, the content of the marking (e.g., the density of the text and/or graphical content), and the residence time of the product beneath the marking target area. The window can have an average width and/or height of, for example, about 1 inch, about 0.5 inches, about 0.25 inches, or less than about 0.25 inches. The lasing recipes (e.g., specifying an arrangement of vectors) can be created, added and/or modified to the memory 222G, for example, by an operator via a GUI of the master controller 222E, as shown and described further below with reference to FIGS. 31A-C. In some implementations, the laser markers 222-1, 222-2 can be configured to anticipate (e.g., via a lookup from the memory 222G in response to detecting a particular product in transit thereto) and pre-process or pre-compile one or more instruction sets (e.g., for one or more cups, in advance of their arrival at the laser marker) and store the pre-processed or pre-compiled instruction sets in a higher-speed buffer such that the instruction set can be performed at the prescribed time with a significantly reduced processing latency. Although shown in FIG. 2A as including two laser markers (222-1 and 222-2), any number of laser markers can be incorporated in a packing line design, for example as shown and discussed below with reference to FIGS. 4-6. In some embodiments, one or more of the laser markers 222-1, 222-1 includes one or more additional components (e.g., sensors, optical components, etc.) that form part of a feedback loop. For example, one or more sensors can be configured to detect/generate real-time, near real-time, or substantially real-time feedback data/information to cause one or more adjustments to the one or more instruction sets. In some embodiments, one or more of the laser markers 222-1, 222-1 is configured to pre-treat a surface of the product prior to laser marking. The pre-treatment can include, for example, abrading or ablating the surface (e.g., to cause carburizing a netting of a surface of a cantaloupe, to create a smooth surface to receive the laser marking).

In some embodiments, the laser marker 222-1 has a first control language and the laser marker 222-2 has a second control language different from the first control language. Each master controller 222E, when generating instruction sets, can take the control language of its associated laser marker 222 into consideration, and can construct the instruction sets based on that control language, such that the instruction sets are either in the control language of the associated laser marker 222 or are otherwise recognizable by the associated laser marker 222. Alternatively or in addition, each master controller 222E can be configured to recognize data received from any of a variety of industrial components 201, each having a different control/operating language, and translate it for use in generating instruction sets. For example, in some embodiments, each master controller 222E can translate data received from the industrial component(s) 201, or an instruction or instruction set generated in response to such data, based on a control language of the industrial components 201 and/or a control language of associated laser marker 222-1 or 222-2 prior to transmitting and/or executing that instruction or instruction set. As such, the master controllers 222E can be viewed as being "control language agnostic," in that they can interface with any type of industrial component 201 and with any type of laser marker 222. Input signals received at a master controller 222E can be, for example, current signals (e.g., from 0 mA to 20 mA), voltage signals (e.g., 5 VDC, 10-42 VDC, 24 VDC, 32 VDC), or any other type of control signal suitable for industrial operations. In some embodiments, the master controllers 222E can detect a signal type and, based on the detected signal type, perform a translation or manipulation of the received signal prior to further processing/calculation. Alternatively or in addition, in some embodiments, an operator can provide an input (e.g., via a GUI or other human machine interface (HMI)) to the master controller to indicate an expected signal type, and based on the operator-defined signal type, the master controller(s) 222E can perform a translation or manipulation of the received signal prior to further processing/calculation.

Figure 2B:
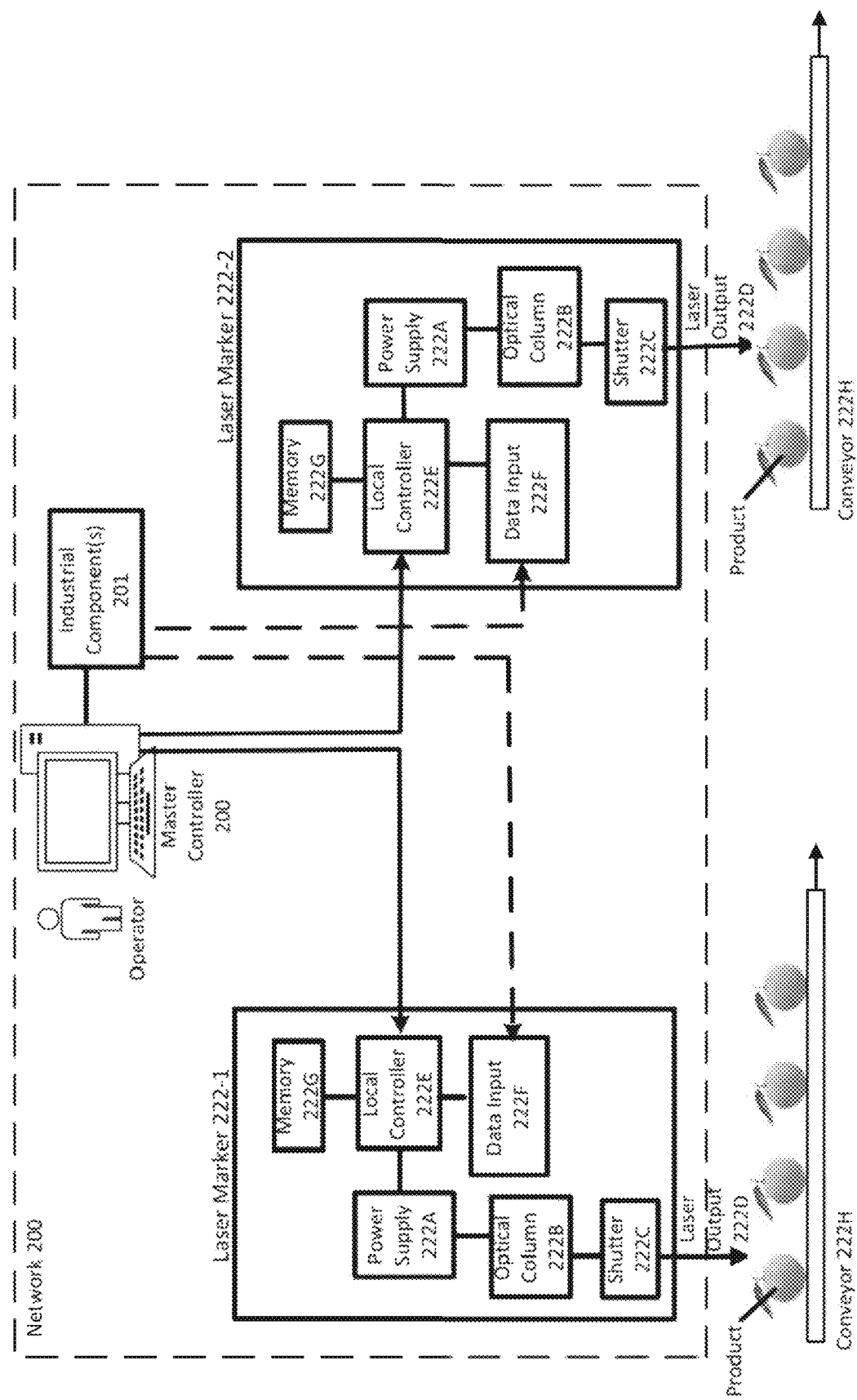
FIG. 2B is a block diagram showing a master controller in operable communication with laser markers, according to some embodiments.

FIG. 2B is a block diagram showing a single master controller 200 in operable communication with laser markers 222-1, 222-2, according to some embodiments. Similar to FIG. 2A, each laser marker (222-1, 222-2) of FIG. 2B includes a power supply 222A, an optical column 222B, a shutter 222C aligned with the optical column 222B, a memory 222G, and a data input 222F, however instead of including onboard master controllers, the laser markers of FIG. 2B include local controllers 222E operably coupled to the power supply 222A, with each of the memory 222G and the data input 222F operatively coupled to the local controller 222E. The power supply 222A can be configured to generate a laser output at a characteristic wavelength of, for example, between about 9 micrometers (μm) and about 12 μm, or between about 10 μm and about 11 μm, or between about 9 μm and about 11 μm, or between about 9.2 μm and about 10.8 μm, or about 10.6 μm, or about 10.625 μm, or about 10.65 μm, or about 10.675 μm. The laser marker optics can include a convex lens (e.g., between about 60 nm and about 600 nm, or between about 100 nm and about 200 nm, or between about 150 nm and about 200 nm, or between about 50 nm and about 200 nm, or about 200 nm, or about 190 nm, or about 180 nm, or about 170 nm, or about 160 nm, or about 150 nm), and can produce a laser beam having a beam diameter at the focal plane of about 0.12 micrometer to about 1.2 micrometer and/or an average power density at the focal plane of between about $2.8 \times 10^4$ W/cm$^2$ and about $8 \times 10^{20}$ W/cm$^2$ (and between about $1.4 \times 10^4$ W/cm$^2$ and about $4 \times 10^{20}$ W/cm$^2$ at the half-Brewster angle point). Each of the local controllers 222E can include or communicate with a programmable logic controller (PLC). Each of the local controllers 222E can receive data packets from the centralized/common master controller 200, the data packets including lasing instructions generated by the master controller 200 using signal data received from industrial components 201 and/or using operator input received via a GUI of the master controller 200. Each of the master controller 200 and the local controllers 222E can include a compute device such as a processor. The master controller 200 and/or the local controllers 222E can include or communicate with a PLC. The memory 222G of each laser marker can store instructions/recipes for operating the laser marker's power supply 222A to cause a predetermined desired pattern to be lased (via the laser output 222D) onto a surface of a product that is disposed and conveyed beneath the laser markers (222-1, 222-2). Such instructions can be executed by the associated local controller 222E. Each of the master controller 200 and the local controllers 222E optionally includes an interface (e.g., a GUI) via which an operator can view and/or modify the instructions/recipes. The lasing recipes can be added and/or modified to the memory 222G, for example, by an operator via a GUI of the master controller 222E. Although shown in FIG. 2A as including two laser markers (222-1 and 222-2), any number of laser markers can be incorporated in a packing line design, for example as shown and discussed below with reference to FIGS. 4-6.

In some embodiments, each of the local controllers 222E and/or the power supplies 222A includes, or is operably coupled to, a "node board" that monitors communications of a communications bus that is common to all laser markers 222 associated with a given conveyor/shaft. In some such embodiments, the laser markers 222 associated with a given conveyor/shaft are communicatively/operatively coupled to one another in a distributed network architecture. The communications bus can include, for example, a distributed network communications bus, and the communications of the communications bus can include, and in some implementations can exclusively consist of, signals representing data packets sent from the master controller 200. Each node board can monitor (or "listen to," in a "listening mode") the communications by: receiving the data packets, inspecting headers of the data packets, and accepting all data packets whose header includes an identifier of that laser marker 222, while rejecting all data packets whose header does not include an identifier of that laser marker 222. The data packets can include binary instructions for operating the laser markers 222, and said instructions can include definitions for one or more of: pattern coordinates, pattern shape, pattern size, pattern density, cup number, position number, arrival time at the laser, lasing angle, product orientation, cup speed, product speed, conveyor speed, conveyor lane chain stretch (which, for example, can vary between lanes of a common conveyor), power level, etc. In some implementations, it takes from about 6 microseconds to about 15 microseconds to process (i.e., read, compile, translate, store value(s) from, etc.) a data packet. Alternatively or in addition, in some implementations, the time window of exposure during which marking can occur ranges from about 100 ms to about 150 ms, or about 110 ms, per cup (or per product). This time window can depend upon conveyor speed and pitch of the conveyor "cup."

Systems of the present disclosure can process (i.e., apply laser markings to), for example, up to about 12 lemons per second, or about 10 oranges per second, or about 22 cherry tomatoes per second, or about 8 grapefruit per second, as examples (and depending upon the complexity of the laser marking being applied).

In some embodiments, the master controller, when generating instruction sets and/or transmitting communications to the laser markers (e.g., including data packets defining instruction sets), uses a matrix decision model or an algorithm to determine the outcome for marking.

In some embodiments, the laser marker 222-1 has a first control language and the laser marker 222-2 has a second control language different from the first control language. The master controller, when generating instruction sets, can take the control language of the destination laser marker 222 into consideration, and can construct the instruction sets based on that control language, such that the instruction sets are either in the control language of the associated laser marker 222 or are otherwise recognizable by the associated laser marker 222. For example, in some embodiments, the master controller 200 can translate an instruction or instruction set based on a control language of the destination laser marker 222 prior to transmitting a data packet including that instruction or instruction set.

In some embodiments, a single master controller 200 is employed "per shaft." In other words, for a given conveyor shaft, which itself may control from one up to a large plurality of conveyor lanes, only one master controller 200 is used to control multiple lasers associated with lanes of that conveyor shaft. In one embodiment, output signals from one master controller 200 be accomplished by providing one signal per lane (e.g., marking potatoes on a grommet conveyor with 24 lanes can be driven by performing signal splitting of the master controller 200 output). In another embodiment, the output signal may be split multiple times to convey information to multiple lanes from a single signal or a number of signals that is smaller than the number of lanes.

Figure 3:
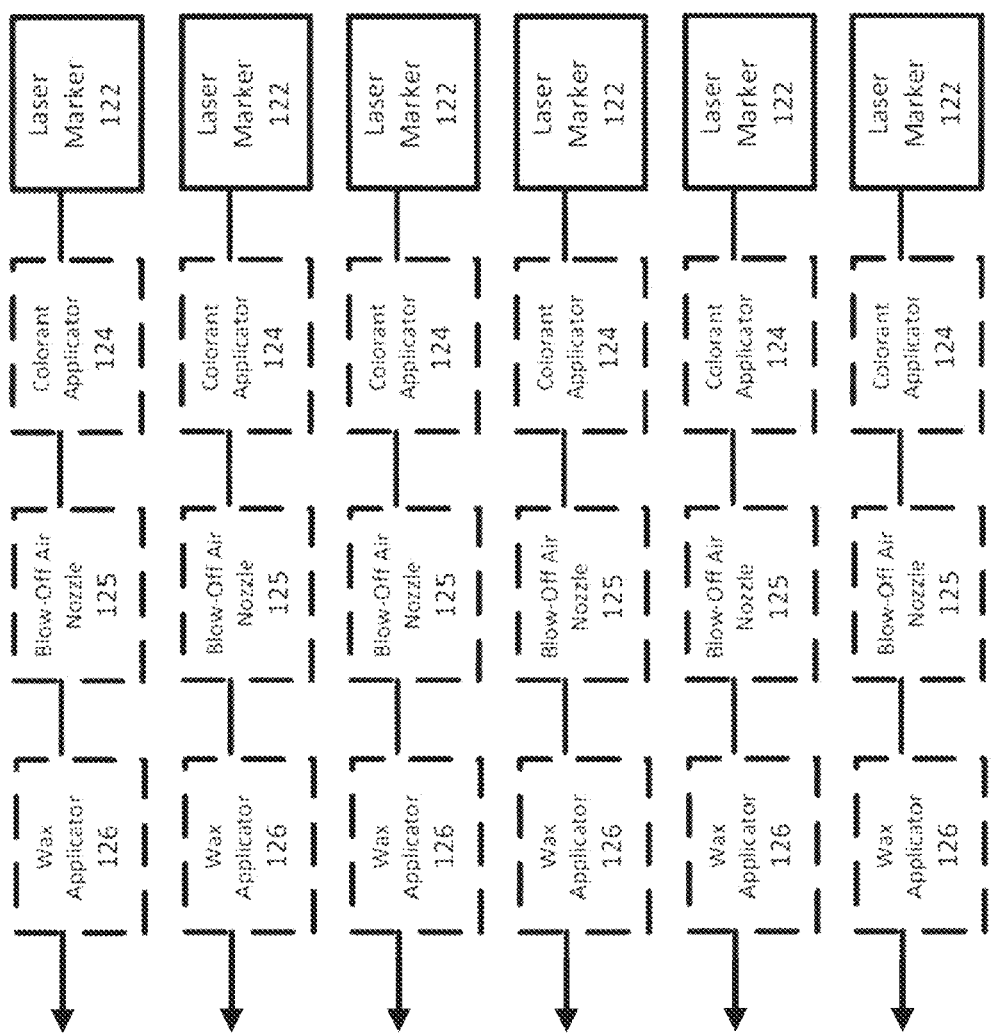
FIG. 3 is a block diagram showing a multi-lane arrangement of laser markers, with one laser marker for each conveyor lane, according to some embodiments.

FIG. 3 is a block diagram showing a multi-lane arrangement of laser markers (e.g., similar to laser markers 222-1 or 222-2 of FIGS. 2A-2B), with one laser marker for each conveyor lane, according to some embodiments. As shown in FIG. 3, colorant applicators 124, air blow-off nozzle (air knife) 125 and wax applicators 126 are optional for each conveyor lane. In some implementations, all lanes will have the same configuration (e.g., laser marker 112, colorant applicator 124, blow-off nozzle 125 and wax applicator 126; laser marker 112 and wax applicator 126, or laser marker 22), while in other implementations the configuration of a subset of the conveyor lanes differs from the configuration of another subset of the conveyor lanes (e.g., a first conveyor lane includes a laser marker 112, a colorant applicator 124, and a wax applicator 126, while a second conveyor lane includes a laser marker 112 and a wax applicator 126). The blow-off nozzle 125 can be a distinct source of compressed air (e.g., not part of the colorant applicator 124 and/or the wax applicator 126) that functions as follows: once colorant has been applied (via the colorant applicator 124) to the product, the air blow-off nozzle 125 fires (i.e., blows air onto the product) using information from the controller (as do the laser marker 122, the colorant applicator 124, and the wax applicator 126). A blanket of air emitted by the blow-off nozzle 125 can remove colorant from portions of the product surface that were not laser marked/etched, effectively preventing smearing, runoff, and/or other impacts.

Figure 4:
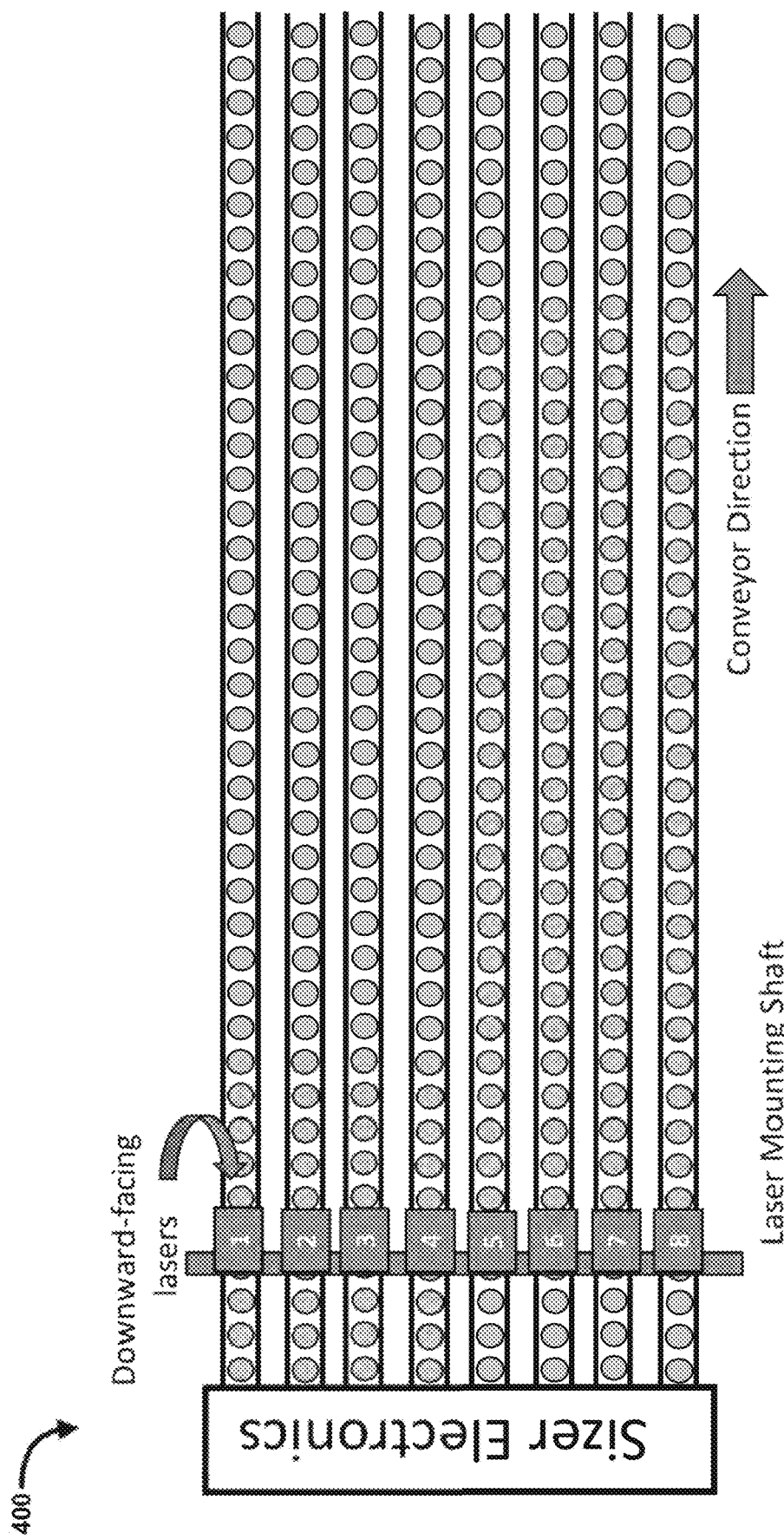
FIG. 4 is a block diagram showing a multi-lane arrangement of laser markers, with one laser marker for each conveyor lane, according to some embodiments.

FIG. 4 is a block diagram showing a multi-lane arrangement of laser markers, with one laser marker for each conveyor lane, according to some embodiments. As shown in FIG. 4, in system configuration 400, products are conveyed along 8 distinct paths/lanes of a conveyor system. The products are conveyed from the sizer electronics along the noted conveyor direction (see arrow in FIG. 4), and 8 downward-facing lasers, each mounted to a common laser mounting shaft, are positioned such that each one of the lasers is aimed at/aligned with and adjacent to a single associated conveyor lane (and, consequently, is configured to apply laser markings, during operation, to products, such as fruit (e.g., citrus fruits, apples, stone fruits, etc.), that are conveyed along that conveyor lane).

Figure 5:
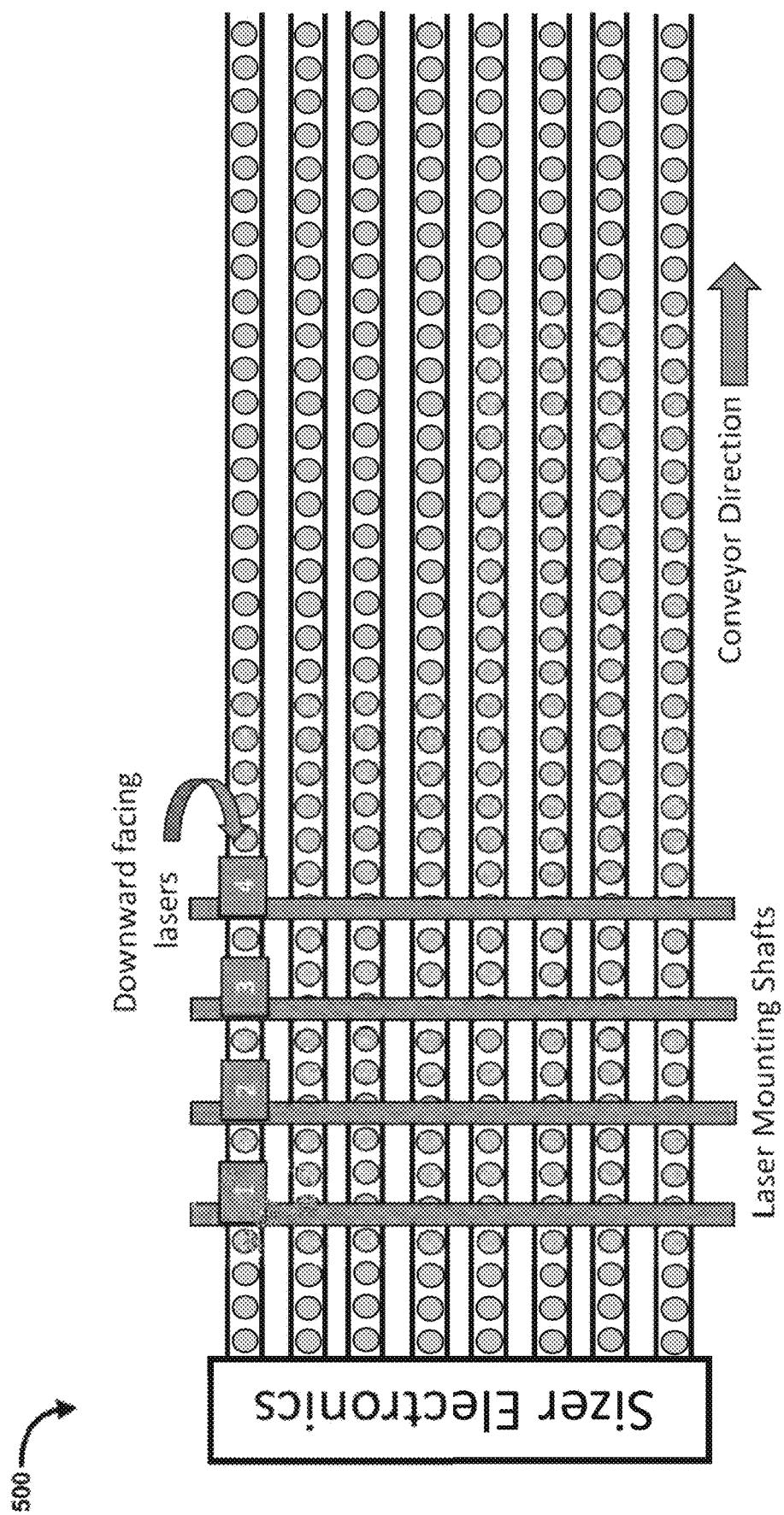
FIG. 5 is a block diagram showing a multi-lane conveyor arrangement, with multiple laser markers for a single/common conveyor lane, according to some embodiments.

FIG. 5 is a block diagram showing a multi-lane conveyor arrangement, with multiple laser markers for a single/common conveyor lane, according to some embodiments. As shown in FIG. 5, in system configuration 500, products are conveyed along 8 distinct paths/lanes of a conveyor system. The products are conveyed from the sizer electronics along the noted conveyor direction (see arrow in FIG. 5), and 4 downward-facing lasers, each mounted to a different one of 4 laser mounting shafts, are positioned at different spatial positions along and adjacent to a common conveyor lane such that each one of the lasers is aimed at/aligned with and adjacent to the same conveyor lane. In system configuration 500, each downward facing laser 1-4 is configured to apply laser markings, during operation, to products, such as fruit, that are conveyed along that common conveyor lane. In some such implementations, for a given product that is being conveyed (e.g., known to and tracked by the system based on a cup identifier or other identifier associated with that product), only one of the lasers 1-4 will apply a laser marking to the product while the product is being conveyed. In other implementations, for the given product, two or more of the lasers 1-4 will apply a laser marking to the product sequentially, at different points in time, while the product is being conveyed.

As a first example, referring to FIG. 5, laser #1 may be programmed to apply a laser marking of a first portion of a complex marking (e.g., an outline) to the product, while one or more of the subsequent lasers #2-4 are programmed to apply a laser marking of a second portion of (e.g., the remainder of) the complex marking, in a process referred to herein as "transparency," or image stitching. In other words, the first portion of the complex marking and the second portion of the complex marking, collectively, form the entirety of the complex marking. Alternatively or in addition, at least one of the lasers #1-4 can be configured to apply laser markings having a relatively narrow line width, (e.g., for laser marking/drawing of an outline), while a different at least one of the lasers #1-4 can be configured to apply laser markings having a relatively broad line width and/or a relatively larger two-dimensional area (e.g., for shading or "filling in" of outlined regions of a complex marking). Lasers for applying the relatively broad line width can include, for example, a rastering capability, so as to cause marking of a large two-dimensional region of the product (e.g., a solid region of laser marking).

As a second example, also referring to FIG. 5, a first laser of lasers 1-4 (e.g., laser #1 or laser #2) may be programmed to apply a first laser marking to a first location of a surface the product, while one or more of the lasers subsequent to the first laser (along the conveyor direction) may be programmed to apply a second laser marking to a second location of a surface of the product. To illustrate, the first laser marking can include a product grade (e.g., in response to or based on a received indication, at a master controller, of a grade detected for that product by the sizer electronics), while the second laser marking can include a product logo and/or brand name.

Figure 6:
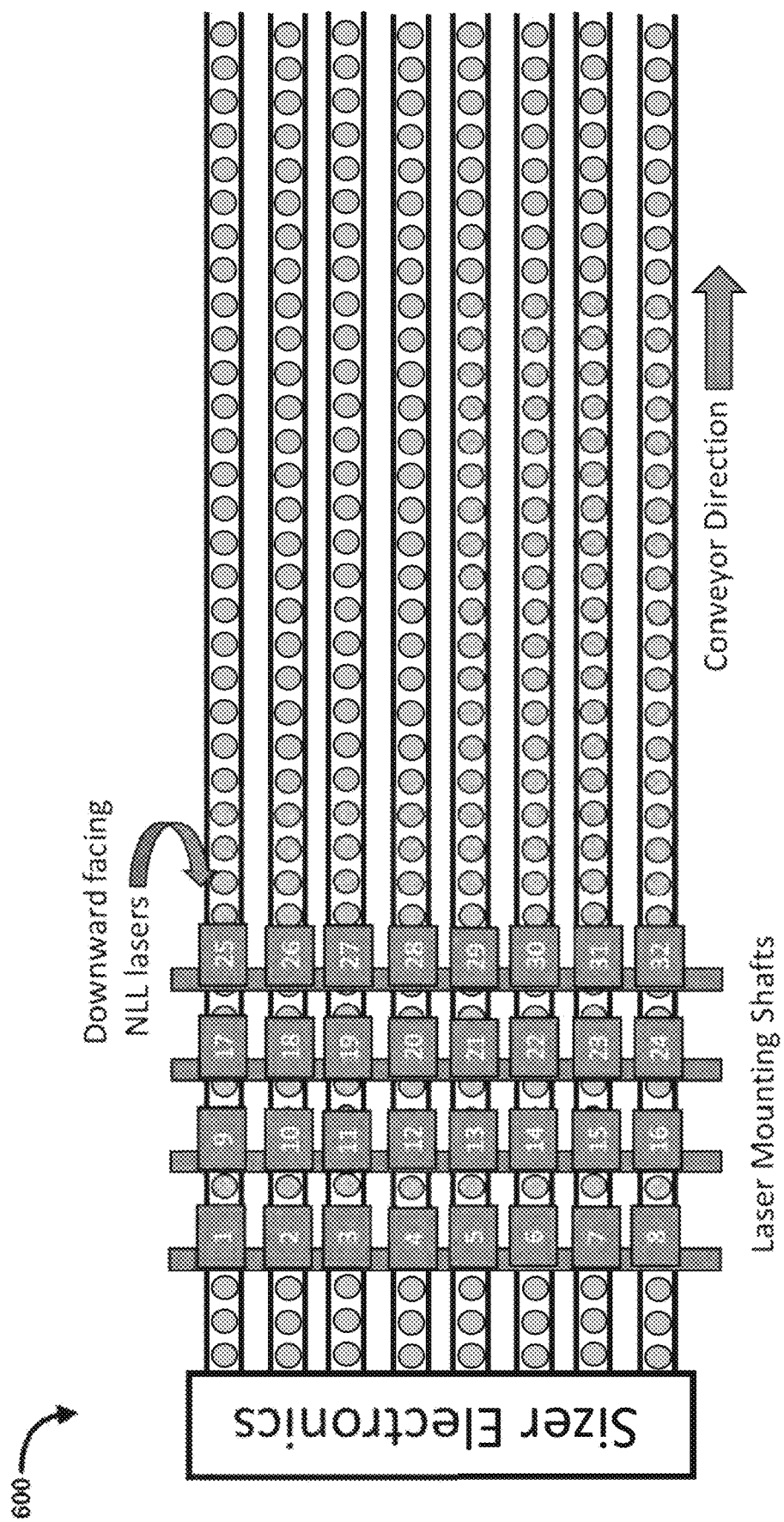
FIG. 6 is a block diagram showing a multi-lane arrangement of laser markers, with multiple laser markers for each conveyor lane (i.e., an array of laser markers), according to some embodiments.

FIG. 6 is a block diagram showing a multi-lane arrangement of laser markers, with multiple laser markers for each conveyor lane (i.e., an array of laser markers), according to some embodiments. As shown in FIG. 6, in system configuration 600, products are conveyed along 8 distinct paths/lanes of a conveyor system. The products are conveyed from the sizer electronics along the noted conveyor direction (see arrow in FIG. 6), and each of an array of 32 downward-facing NLL lasers is mounted to one of 4 laser mounting shafts, with each of eight unique 4-laser subset from the array of lasers being assigned to an associated conveyor lane, each laser from a given 4-laser subset being positioned at different a spatial/linear position along and adjacent to that conveyor lane such that each one of the lasers from the 4-laser subset is aimed at/aligned with and adjacent to that conveyor lane. In system configuration 500, each downward facing laser 1-4 is configured to apply laser markings, during operation, to products, such as fruit, that are conveyed along that common conveyor lane. Given the two-dimensional, arrayed assortment of the lasers in the configuration of FIG. 6, any of the capabilities of configuration 400 (as described above with reference to FIG. 4) and/or any of the capabilities of configuration 500 (as described above with reference to FIG. 5) can also be performed by system configuration 600 of FIG. 6.

Figure 7:
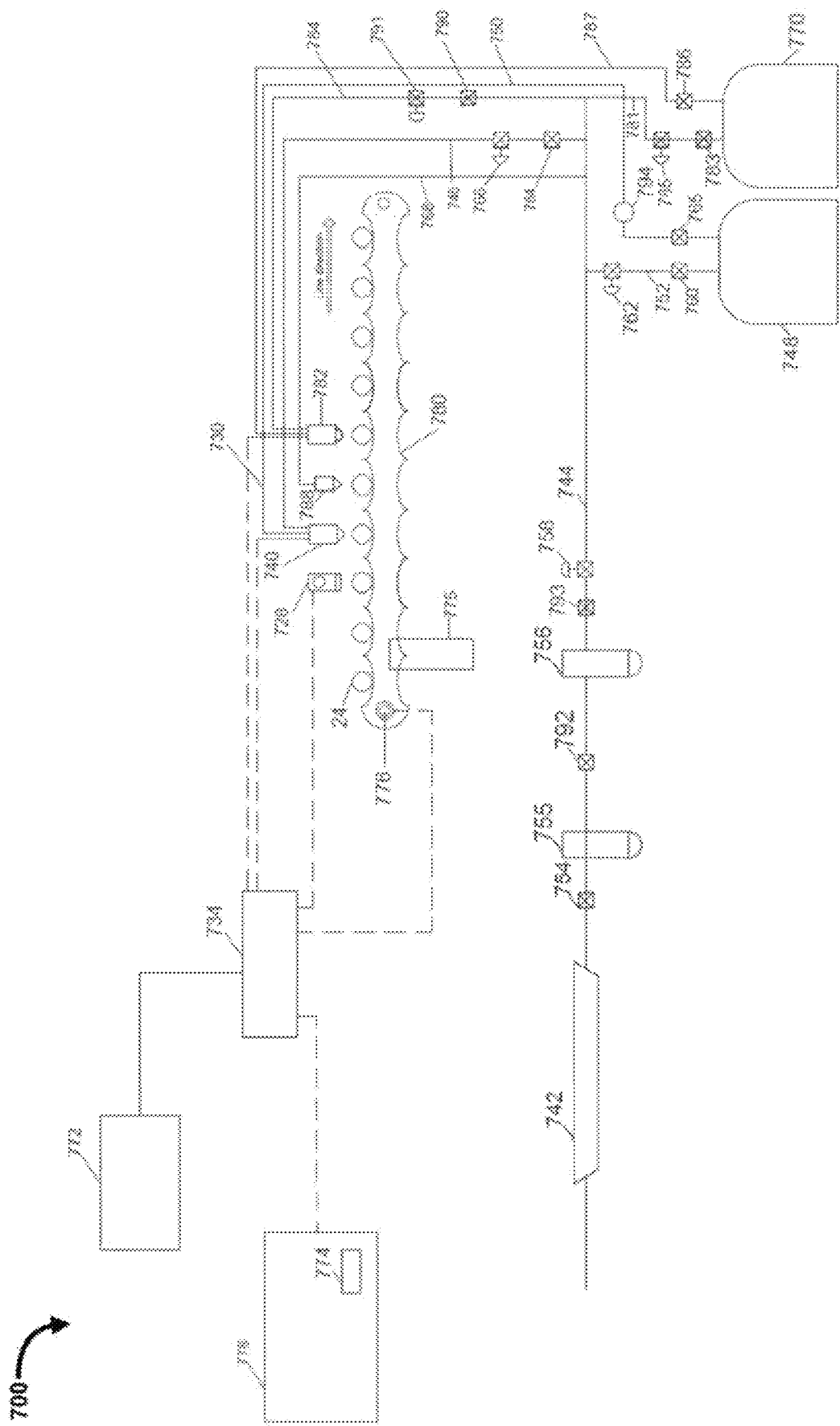
FIG. 7 is a schematic diagram of a marking system, according to some embodiments.

As discussed above, the laser marking of patterns onto products, as described herein, can be an ink-free process. In other words, as described herein, applying laser energy to the surface of the product to remove pigment therefrom does not include or require the use of ink (i.e., is "ink free"), however in some implementations, ink, food colorant, or other dyes/colorants can be used in one or more subsequent steps to add color and/or to enhance a contrast between the laser-marked regions and the unmarked regions. FIG. 7 is a schematic diagram of a laser marking system, including colorant and wax applicators, according to some embodiments. As shown in FIG. 7, the laser marking system 700 includes a laser marker 728 (e.g., similar to laser marker 122 of FIG. 1, or laser markers 222-1 and 222-2 of FIGS. 2A-2B) for applying a lased pattern to a product. The laser marking system 700 can be used to apply laser markings/patterns to a wide variety of products, including (but not limited to) foodstuffs such as fruits, vegetables, eggs, and meat. Also shown in FIG. 7 is a colorant spray station 730 for applying a non-toxic, food grade colorant, such as FD&C Red #40, FD&C Red #1 or FD&C Blue #1, over an etched pattern (created in a product by the laser marker 728). The spray station 730 includes a high speed, air atomizing, low volume spray head 740 with a compressed air source 742 connected thereto by conduits/lines 744, 746, and a fluid reservoir 748 connected thereto by conduit 750. The colorant tank 748 is also connected, via conduit/line 752, to conduits/lines 744 and 746. A block valve 754, an oil separator 755, a block valve 792, an air dryer/filter 756, a block valve 793 and an air pressure regulator 758 are positioned along conduit 744 between the compressed air source 742 and the conduit 752 from the colorant tank 748. A block valve 760 and an air pressure regulator 762 are positioned along conduit 752, between the compressed air source 742 and the colorant tank 748. A block valve 764 and an air pressure regulator 766 are positioned along conduit 746, a block valve 765 and a 40 microliter biofilter 794 to prevent contamination are positioned along conduit 750. The spraying station 730 is controllable by a PLC 734. Following the colorant spray station 730 in the color enhancement system shown in FIG. 7 is the blow-off air applicator 788 for removing colorant applied by the color head 740 that is not adhered directly to the laser marking on the product 24. The blow-off air applicator includes a high speed, low volume blow-off air nozzle 788 with a compressed air source 742 connected thereto by conduit lines 744 and 789. A block valve and an air pressure regulator 791 are positioned along conduit 789. In a manner similar to the colorant applicator, in some embodiments, a wax applicator 782 is provided to reseal the etched pattern on the product 24. The wax applicator includes a high speed, low volume wax spray head 782 with a compressor air source 747 connected thereto by conduit lines 744 and 784 and a wax tank 770 connected thereto by conduit 781. A block valve 783 and an air pressure regulator 785 are positioned along conduit 781 between the compressed air source 742 and wax tank 770. A block valve 790 and an air pressure regulator 791 are positioned along conduit 784 and a block valve is positioned along conduit 787. In some embodiments, a wax applied by a wax applicator of the laser marking system includes a fungicide (e.g., tiabendazole, "TBZ") similar to that applied initially to the product during pre-marking packing operations.

The colorspray head 740 can include a spray head configured to achieve a desired liquid spray volume and spray pattern. The color spray head 740 can have a continuous duty rate of, for example, ranging from 5,000 up to about 20,000 cycles per minute. The spray head 740 can be operated using a DC power source (e.g., supplying 24V DC at 0.5 amps). The color spray head 740 can be mounted within the laser marking system 700 such that it is positioned at a predetermined distance (e.g., from between about 3 inches to about 6 inches) from an average height of a product 24 (e.g., produce) that will be conveyed therebeneath, such that the spray head 740 does not contact the product 24. Because the color spray head 740, compressed air blow-off head 788 and the wax spray head 782 do not contact the product 24, unwanted migration of the product 24 along the conveyor lane can be reduced or prevented, unwanted wax buildup (e.g., resulting from mechanical transfer from a surface of produce or other products) in the spray head 740 can be prevented, and food safety can be improved, since decay organisms and other unwanted contaminants cannot be physically transferred, via the spray head 740 and wax head 788, from one product to another subsequent product.

The spray head 740 can be electronically controlled by the PLC 734 (the PLC being part of, or in communication with, a master controller or local controller, such as those shown and described with reference to FIGS. 2A and 2B, above), to precisely control application of the food grade colorant to the marked region of the product 24, without excessive overcoverage. The PLC 734 can be programmed, for example, to coordinate the timing of the colorant application such that the colorant application begins coincident with or substantially coincident with an alignment of the spray head 740 nozzle/output with a first/beginning edge of the marked region of the product 24, and such that the colorant application terminates coincident or substantially coincident with an alignment of the spray head 740 nozzle/output with a second/ending edge of the marked region of the product 24. In some implementations, the laser marking system 700 is configured (e.g., via the PLC 734, master controller and/or local controller) to automatically and/or dynamically (i.e., in response to an autonomously received or operator input signal) adjust the spray timing, for example based on a detected size or type of the marked region of the product 24, a line speed of the conveyor, etc. In other words, the spray station 730 can be configured to detect one or more changes to a product marking (e.g., among products as they are conveyed toward the spray station 730) and/or to operational parameters (e.g., conveyor speed, product grade, etc., in real time or substantially in real time), and to adjust a spray pattern or procedure in response to the detected change(s).

In some embodiments, the PLC 734 is programmed to automatically and instantaneously or substantially instantaneously adjust the spray head 740, blow-off head 788 and wax applicator 782 to synchronize with differing/changing conveyor line speeds, without interruption of the production run. The spray head 740 can be configured to operate over a wide range of operating speeds, for example from 1 cup per second (cps) to 14 cps, or from 1 cps to 16 cps, or from 1 cps to 18 cps, or from 1 cps to 20 cps, or from 1 cps to 25 cps, or from 1 cps to 50 cps, or from 1 cps to 75 cps, or from 5 cps to 20 cps, or from 20 cps to 50 cps, etc. The spray head 740 can apply accurate, adjustable spray patterns for optimal coverage of marked regions of conveyed products 24. Spray heads 740 of the present disclosure are dependable, have relatively low operational maintenance requirements, and have relatively long operational service life, as compared with known colorant application methods.

In some embodiments, during use, an operator inputs a code for a desired pattern to be applied (via laser marking) to the product 24 and/or system parameters via a user interface (e.g., a GUI) 772 that is operably coupled to the PLC 734. Based on the operator input and/or based on input from external sensors in communication with the PLC 734, the PLC 734 calculates operational parameters for the laser marking system 700 to operate properly and to impart the desired pattern to the product 24. As shown in FIG. 7, the PLC 734 has three external inputs: a product sensor 774, a cup sensor 775 and a shaft encoder 776. The product sensor 774 can be part of a sizer 778, and during operation can detect the presence of a product 24 for marking, on an associated conveyor lane, and send data associated with the detection event to the PLC 734. The product sensor 774 can include, for example, a send-and-receive infrared (IR) beam switch. The cup sensor 775 characterizes the precise location of the cup or other singulating device so as to properly locate the product for marking by outputting a signal to the PLC. The shaft encoder 776 can include a sensor that is mounted on the conveyor 780, and during operation, can record (e.g., continuously or at a predetermined/pre-programmed schedule) a line speed of the conveyor 780 and output a signal representing the line speed data to the PLC 734 for use in timing calculations. In some implementations, the laser marking system 700 includes a safety interlock to limit the exposure of the beam of the laser marker 728 to desired time intervals and/or locations along the conveyor lane.

During operation of the laser marking system 700, a product 24 is transported, via the conveyor 780, from the sizer 778, to the laser marker 728. After the sizer 778 has inspected or otherwise processed the product 24, a signal representing a detected line speed is sent from the shaft encoder 776 to the PLC 734. Upon detection by the PLC 734 (e.g., based on timing data received from the sizer 778 and/or based on a position sensor) that the product 24 is disposed beneath the laser marker 728, the PLC 734 can send a control signal to the laser marker 728, thereby causing the laser marker 728 to apply the laser marking to a surface of the product 24. In some embodiments, when the product 24 is a fruit or a vegetable, the laser marker 728 can produce a light-colored (e.g., off-white to light tan) residual marking on the fruit or vegetable as a result of laser-induced vaporization and/or removal or modification of pigmentation thereof, indicative of absence of pigment. Next, the product 24 is transported via the conveyor 780 to the spray station 730. Upon detection by the PLC 734 (e.g., based on timing data received from the sizer 778 and/or based on a position sensor) that the product 24 is positioned/disposed beneath the spray head 740, the PLC 734 sends a signal to the spray station 730 to cause colorant to be dispensed onto the laser marking on the product 24. Air can be supplied from the compressed air source 742, transiting along conduit 744, through block valve 754, oil separator 755, air dryer/filter 756 and air pressure regulator 758, along conduit 746, through block valve 764, and air pressure regulator 766 to the spray head 740 to aid the dispensing of the colorant. Air also flows along line 752, through air pressure regulator 762, through block valve 760 and into the fluid reservoir 748. The air supplied to the fluid reservoir 748 creates a head pressure on the fluid (i.e., colorant), thereby controlling the amount of colorant that is supplied to the spray head 740 and then applied to the product 24. The fluid from the fluid reservoir 748 flows along conduit 750, through block valve 765 to the spray head 740. The air supplied to the spray head 740 causes atomization of the colorant fluid. The atomizing can provide several advantages: first, atomizing can result in an overall consistent spray coverage and pattern; second, atomizing can reduce the amount of fluid used for a given application, since atomizing reduces the droplet size (e.g., to a size of between about 200 micrometers (µm) and about 500 µm, or about 200 µm, or about 250 µm, or about 300 µm, or about 350 µm, or about 400 µm, or about 450 µm, or about 500 µm) and can accomplish uniform coverage with less fluid; and third, atomizing aids in delivery of the fluid to the product 24 over the desired distance with little or no loss to pattern fidelity (for example by virtue of the inertia and momentum of the atomized droplets). If the PLC 734 detects (e.g., based on an operator input or a lack of operator input) that no pattern is to be laser marked on a particular product 24, the PLC 734 does not activate the laser marker 728 and the spray head 740.

Because the laser marker 728 and the spray head 740 are positioned in close proximity to one another and configured to process a product 24 in sequence, the spraying of the colorant occurs shortly after the laser marking is applied, thereby facilitating uniform or substantially uniform absorption of the colorant by the laser marking on the product 24. In some embodiments, the colorant is applied to the laser marking on the product 24 within about 300-500 milliseconds (ms) after the laser marking has been applied by the laser marker 728.

In some embodiments, the PLC 734 signals the spray station 730 to operate the spray head 740 only after the PLC 734 has instructed the laser marker 728 to etch the laser marking onto the product 24. The spray location is impacted by the spray timing (which can be calculated, for example, based on line speed) and the size (e.g., code length) of the laser marking pattern. The PLC 734 can be programmed to control the centering of the laser marking applied to the product 24 by the laser marker 728, for example by calculating a starting location and an ending location for the laser marking, for example based at least in part on line speed and/or position of the product 24 within the conveyor lane. The PLC 734 can be programmed to begin firing/operating the spray head 740 at a precise starting time, and to keep the spray head 740 firing/operating until the entirety (e.g., the full length) of the laser marking has passed by (and, consequently, has been covered/coated with the colorant). In some implementations, the spray pattern of the colorant is substantially the same as the pattern of the laser marking. In other implementations, the spray pattern of the colorant has a different shape and/or is larger than the pattern of the laser marking.

During operation of the laser marking system 700, the PLC 734 can dynamically/automatically adjust the triggering signal that it sends to the spray head 740 in response to detecting a change in the conveyor line speed. For example, if the conveyor line speed is moving at a rate of 150 fpm and was then slowed to 50 fpm, the PLC 734 could detect the change, and in response to detecting the change, automatically calculate and adjust the triggering of the spray head 740. In the 150 fpm 50 fpm example, the spray head 740 would need to remain on/operational for a longer period of time, due to the slower line speed, to ensure that the entire laser marking is covered. As another example, if the PLC 734 detects that the conveyor line speed has increased to 200 fpm and that the diameter of the product 24 is about 4", the PLC 734 can calculate that only 250 ms will transpire before the product 24 passes/transits a particular point along the conveyor line. If the laser marking is 1" long, the spray head 740 would need to be triggered sooner, and left on for less time (approximately 65 milliseconds (ms)), to fully cover the 1" long laser marking. If the conveyor line speed was then slowed back down to its original speed of 100 fpm, the PLC 734 would calculate that it will take 500 ms for the product 24 to pass, and, as such, there would be a longer delay before the spray head 740 was triggered, and the on-time for spray-coating the laser marking would be longer (approximately 125 ms). As such, the laser marking system 700 can detect line speed changes and adjust control parameters in response to the detected line speed changes.

In some embodiments, as shown in FIG. 7, the laser marking system 700 also includes an air knife 782, positioned after the spray head 740, to which air is supplied, via conduit 784, from the compressed air source 742. The air knife 782 can be used to blow off excess colorant that has been deposited on the product 24.

FIG. 8 is a plan view of a marking pattern that can be applied using a lasing/marking system and/or method of the present disclosure, in accordance with some embodiments. As shown in FIG. 8, the example marking pattern 800 (also referred to herein as a "natural light label") includes a product name ("Grapefruit"), a brand ("Premier"), a price lookup number (PLU#) ("4288"), a country of origin ("USA"), and a traceability code ("12345678ABCD"). In view of the dynamic programmability (e.g., via the master controller) of systems set forth herein, laser marking patterns can include virtually any data content and combination, constrained only by readability and the dimensions of the product being marked. Laser markers of the present disclosure can be configured to recognize and laze up to 1.268 million different "natural light" labels (i.e., laser marking patterns). Moreover, systems set forth herein (e.g., using a master controller or local controller for a given laser marker) can be configured to generate, translate, render and/or lase text in any desired human language (e.g., English, Chinese, Italian, etc.). Translation of a marking text can be performed in response to an operator-provided instruction (e.g., via a GUI) and/or in response to data received from an industrial component in communication therewith (e.g., triggered by the detection of a produce type, origin, label, or feature). Example data fields that might be selected for and combined into a marking pattern, in any combination, within or as part of a marking of the present disclosure include (but are not limited to): product name, PLU, product size, brand, field location, provenance, growth data, harvest data, physical description (e.g., height, weight, dimensions, color), product grade, ripeness, age, expiration date, ripening date, organic designation, price, retailer, grower, consumer, graphical image, logo, etc. The foregoing data can be input to the system (and compiled as part of an instruction set, e.g., by a master controller) by an operator/user (e.g., via a GUI), may be automatically detected by the laser marker(s), sizer(s), and/or other industrial equipment in operable/networked communication with the system, or a combination of both (i.e., some data is user-provided, such as graphic images, and some data, such as grade, is automatically detected by a sizer or other equipment).

Figure 9:
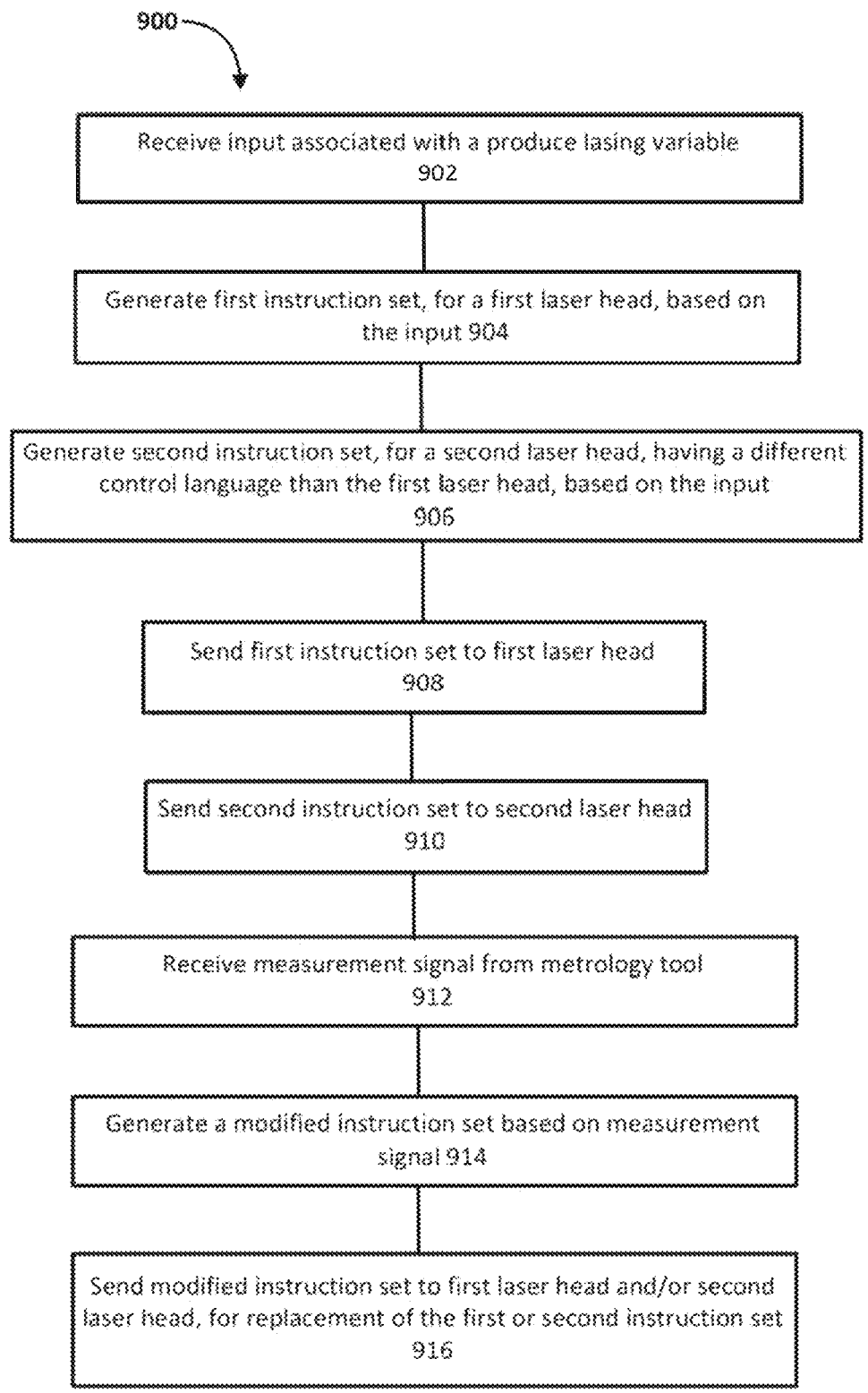
FIG. 9 illustrates a method for coordinated laser marking of conveyed items, according to some embodiments.

FIG. 9 illustrates a method for coordinated laser marking of conveyed items, according to some embodiments. As shown in FIG. 9, the method 900 begins at 902 with receiving (e.g., at a processor, such as of a master controller or a local controller described herein) an input associated with a produce lasing variable. Example inputs that can be received by the processor include, but are not limited to: a conveyor speed, a product grade, a product position, a laser firing time, a laser firing location, a safety condition of the laser marker (e.g., a shutter condition (open/closed) or a laser "dump"/redirect condition (true/false)), a laser marking pattern, and a letter marking pattern modification. At 904, a first instruction set for a first laser head is generated (e.g., via the processor) based on the input. The first laser head can have a first control language, and the first instruction set can be compatible with the first control language. At 906, a second instruction set for a second laser head is generated (e.g., via the processor) based on the input, the second laser head having a second control language different from the first control language. The second instruction set can be compatible with the second control language. At 908, the first instruction set is sent to the first laser head, and at 910, the second instruction set is sent to the second laser head. At 912, the processor receives a measurement signal, encoding a measurement, from a metrology tool. In response to the measurement signal, at 914, the processor generates a modified instruction set based on the measurement signal. The modified instruction is then sent, at 916, to the first laser head, for replacement, by the first laser head, of the first instruction set with the modified instruction set.

Figure 10:
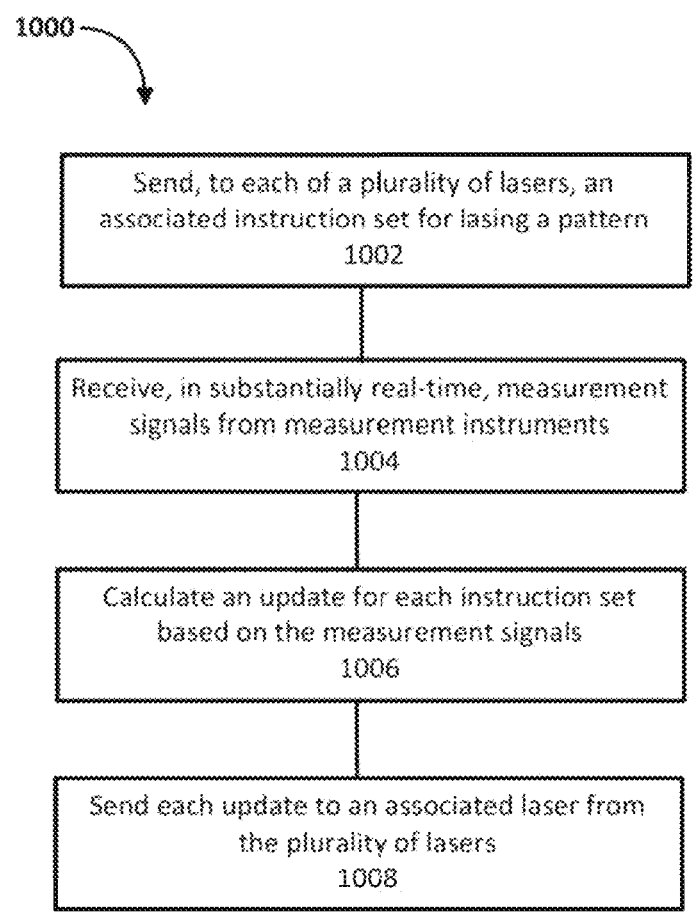
FIG. 10 illustrates a method for generating instruction set updates for coordinated laser marking of conveyed items, according to some embodiments.

FIG. 10 illustrates a processor-implemented method for generating instruction set updates for coordinated laser marking of conveyed items, according to some embodiments. As shown in FIG. 10, the method 1000 includes sending, at 1002 and to each laser from a plurality of lasers, an associated instruction set from a plurality of instruction sets. Each instruction set from the plurality of instruction sets includes instructions to lase a predetermined pattern onto food product while the food product is conveyed. At 1004, a plurality of measurement signals is received from each of a plurality of measurement instruments and substantially in real-time. At 1006, an update is calculated for each instruction set from the plurality of instruction sets based on an associated measurement signal from the plurality of measurement signals, in response to receiving the plurality of measurement signals. The updates are then sent, at 1008, to each associate laser from the plurality of lasers and during operation of the plurality of lasers, such that at least one lasing parameter of that laser is adjusted.

Figure 11:
FIGS. 11-24 are photographs showing example aspects of the industrial environment of FIG. 1, according to an example implementation.
Figure 12:
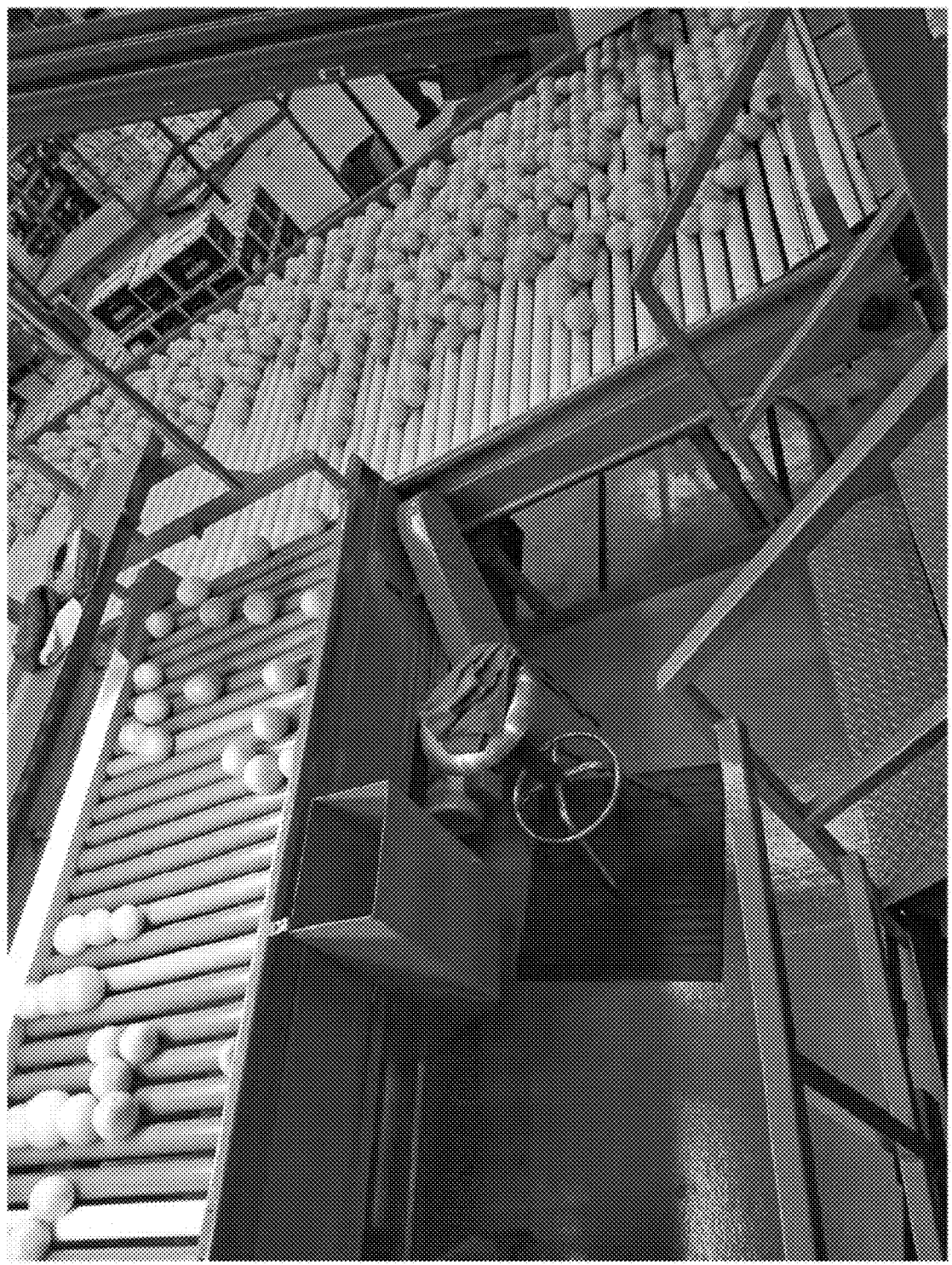
Figure 13:
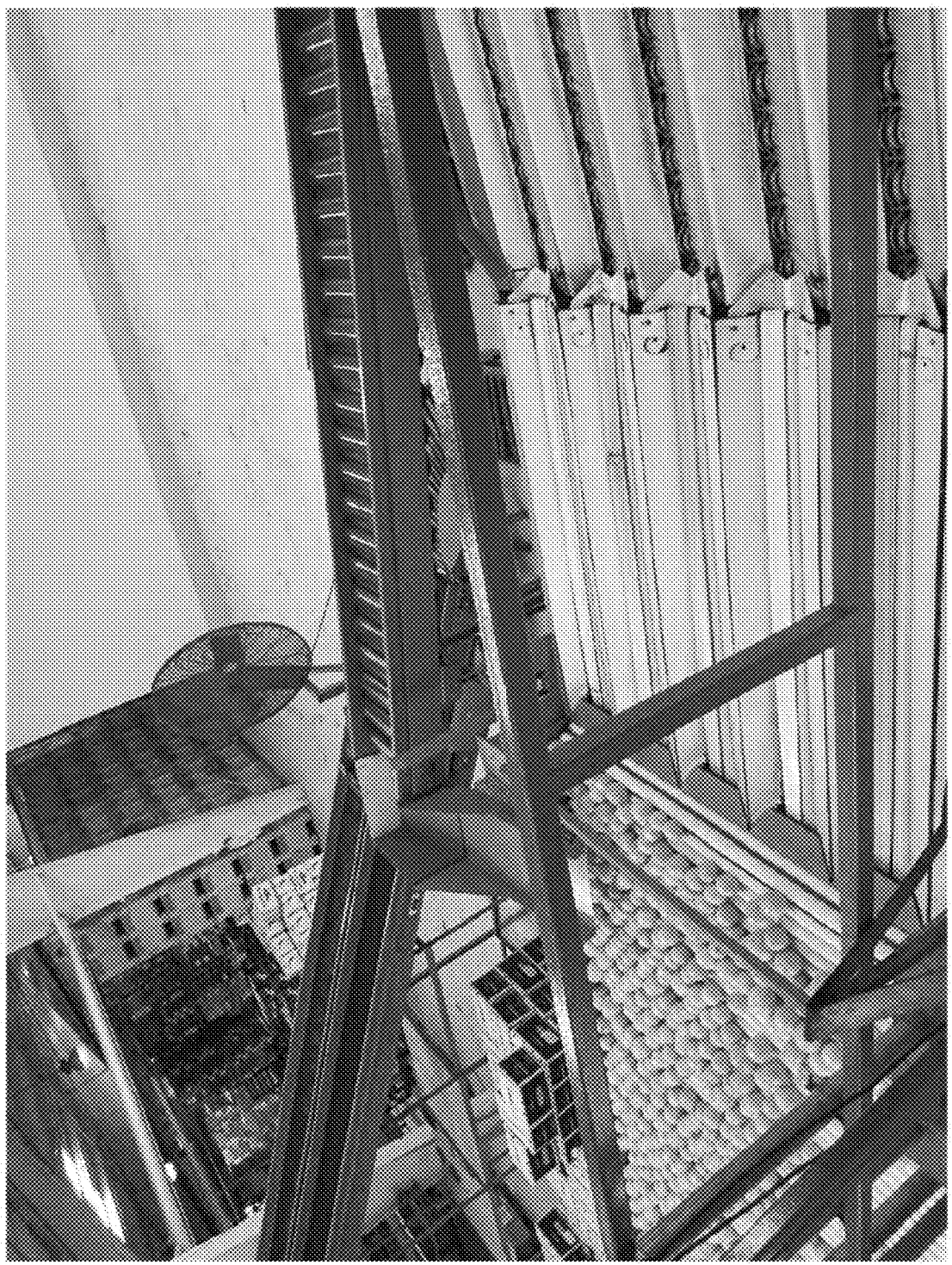
Figure 14:
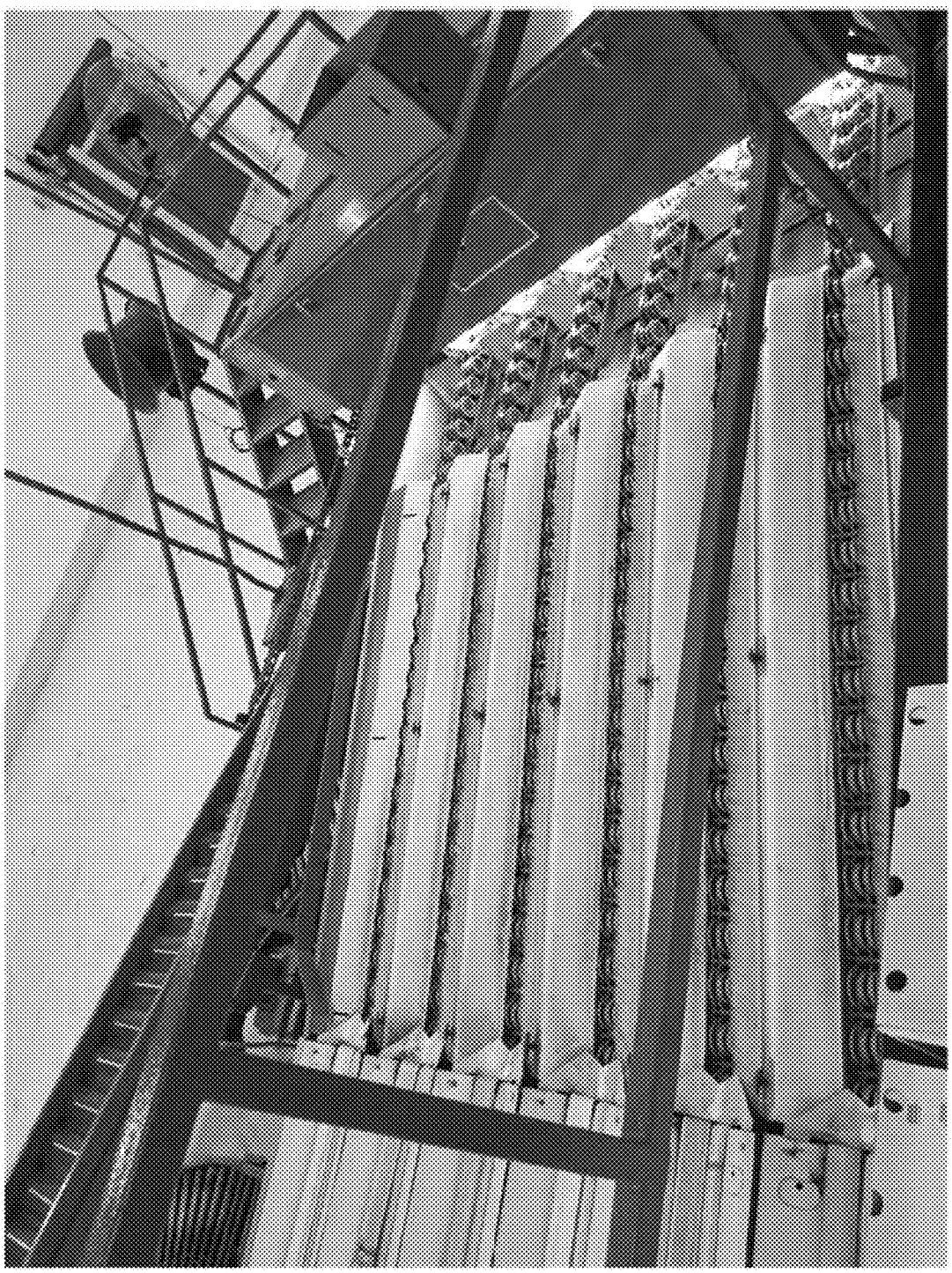
Figure 15:
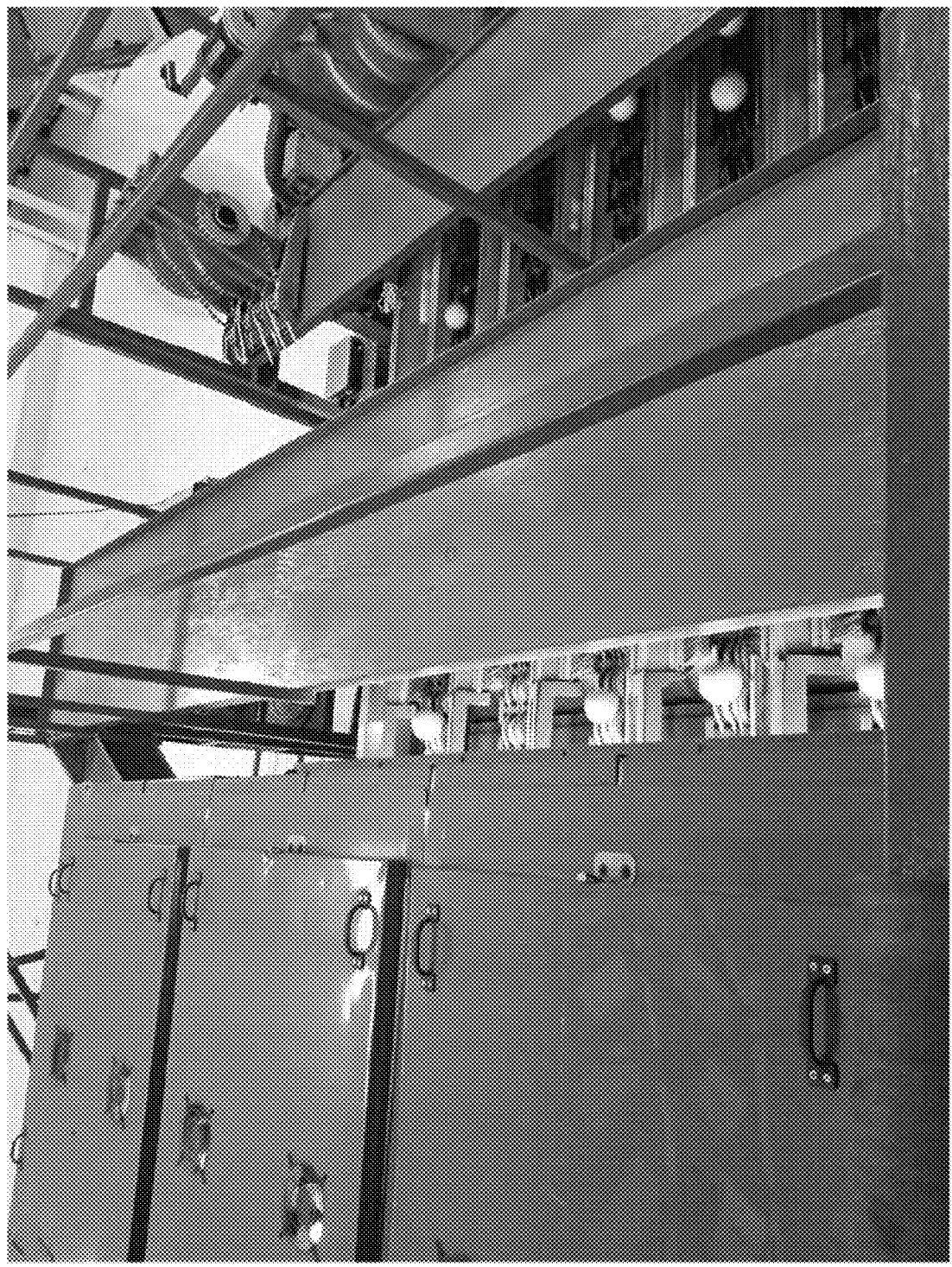
Figure 16:
Figure 17:
Figure 18:
Figure 19:
Figure 20:
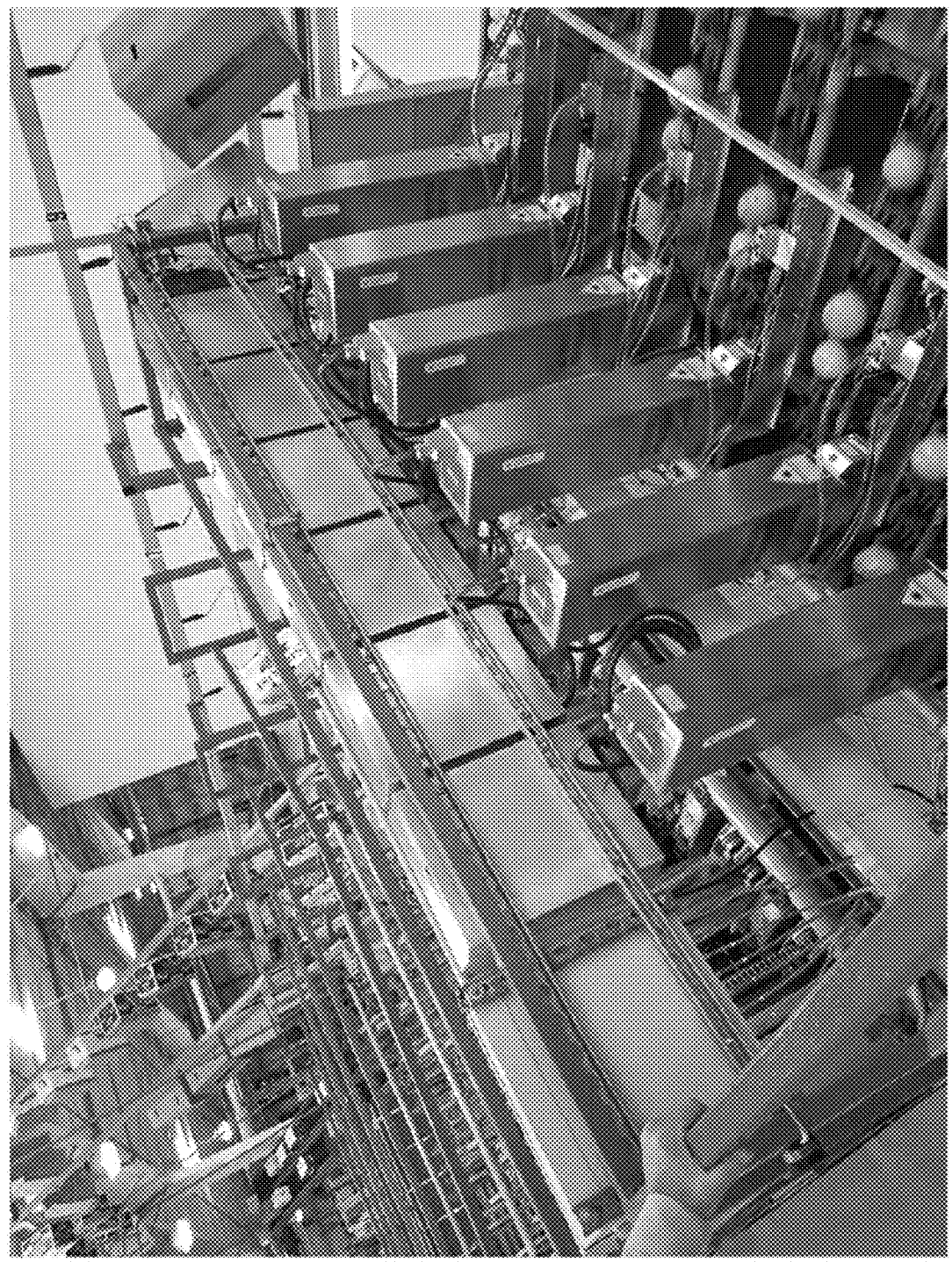
Figure 21:
Figure 22:
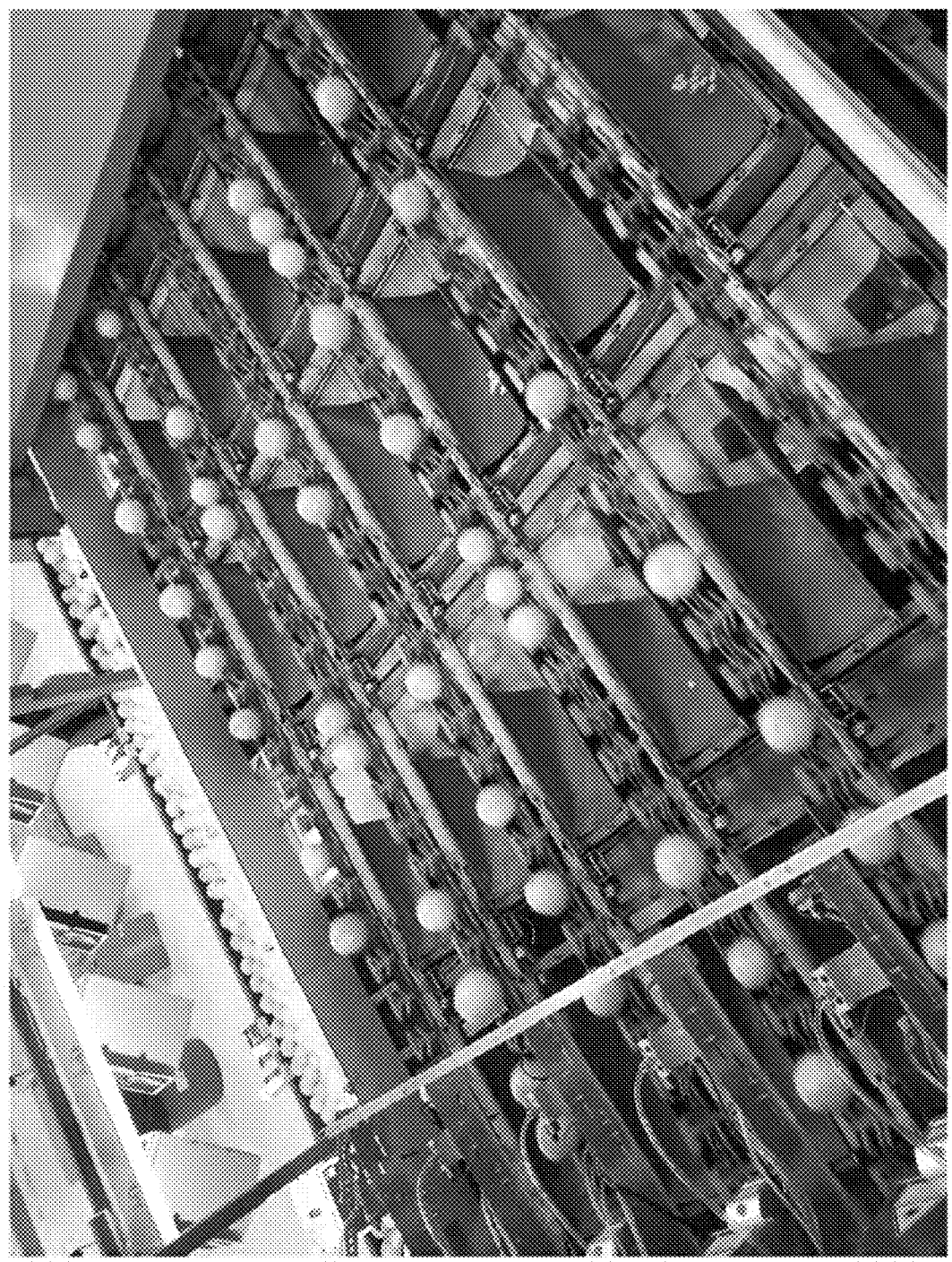
Figure 23:
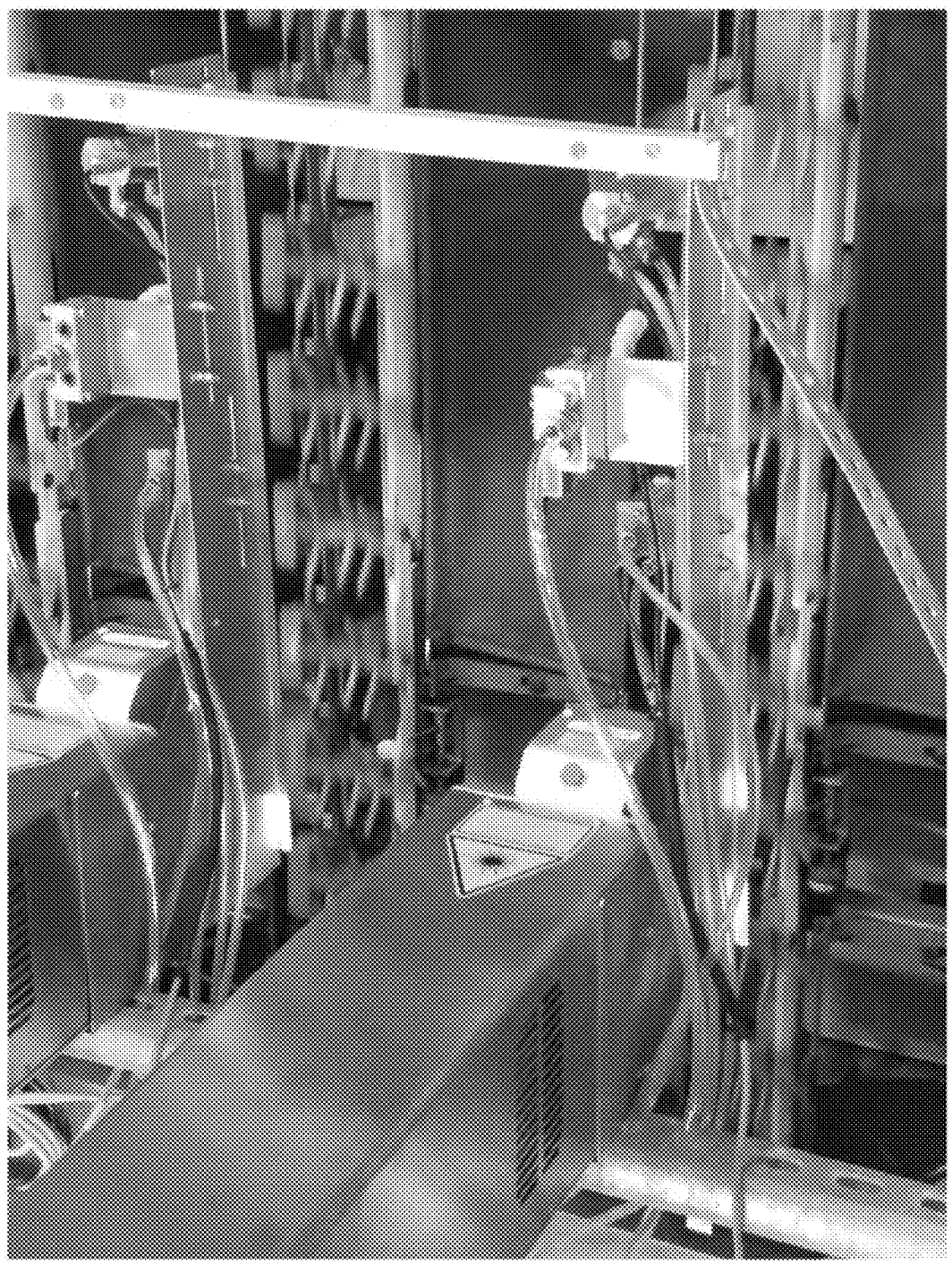
Figure 24:
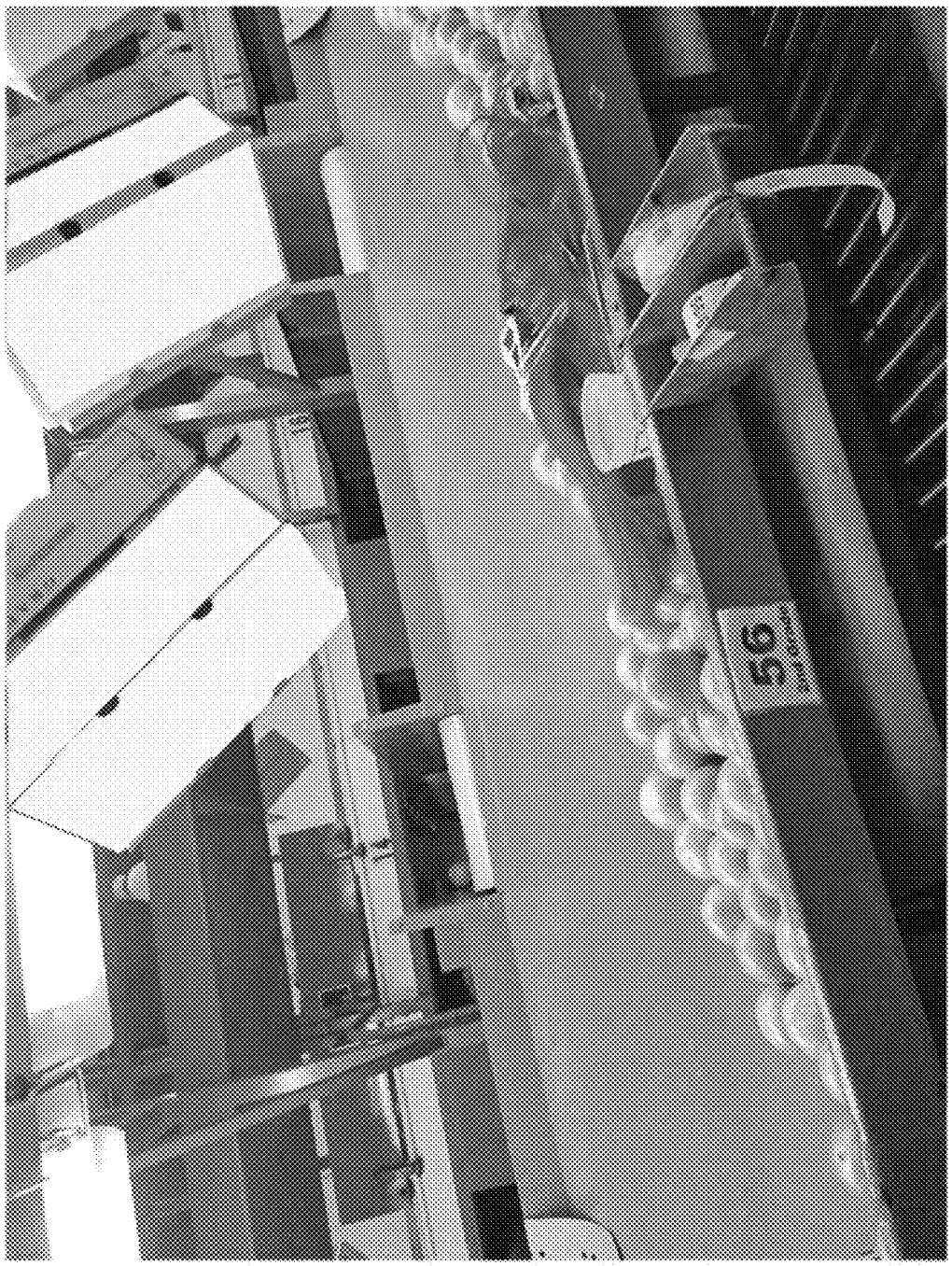
Figure 25:
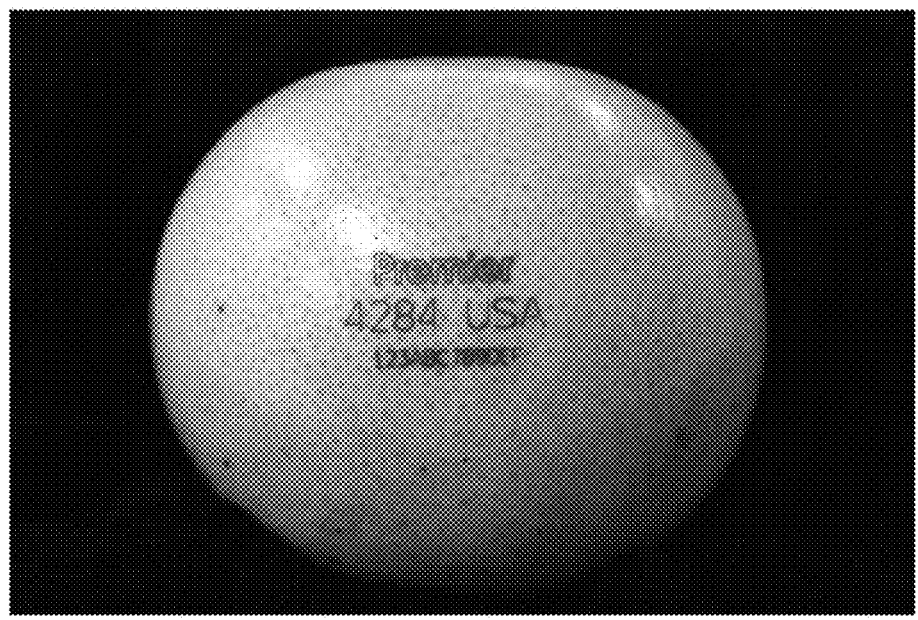
FIGS. 25-28 are photographs showing examples of marked food products that can be produced using lasing/marking systems and/or methods of the present disclosure, in accordance with some embodiments.
Figure 26:
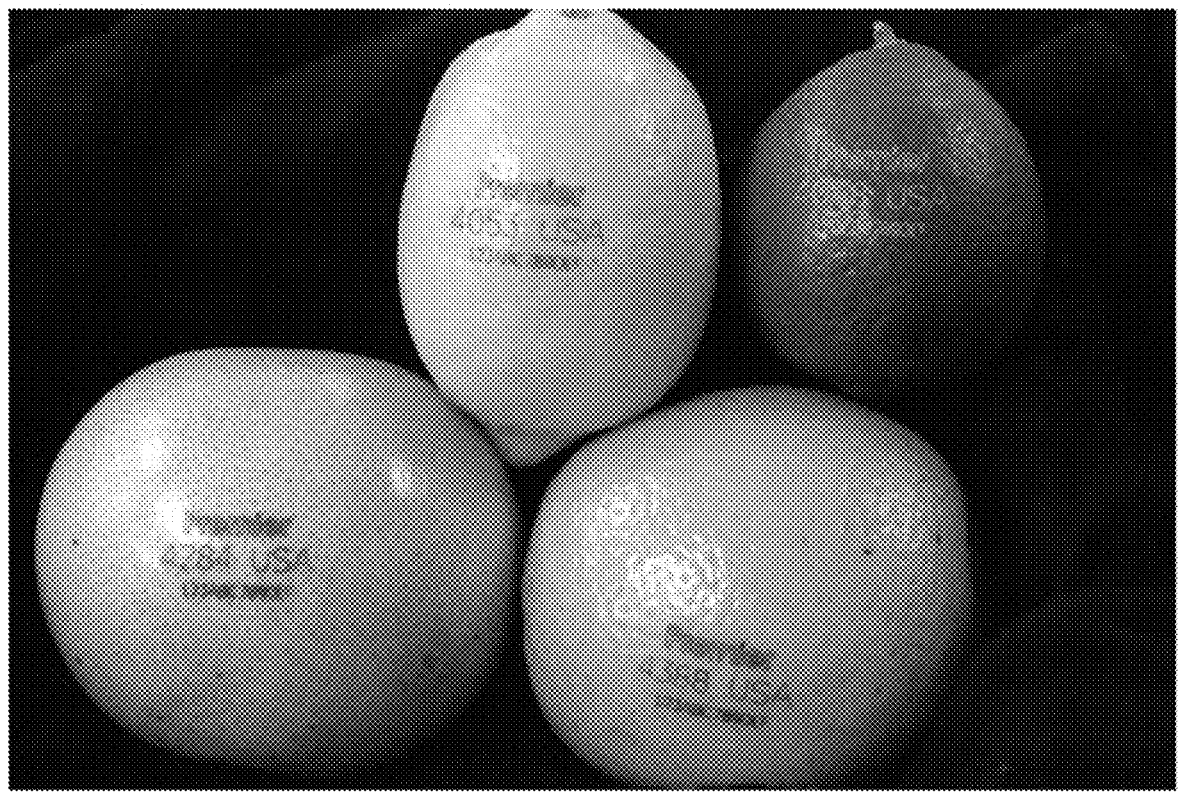
Figure 27:
Figure 28:
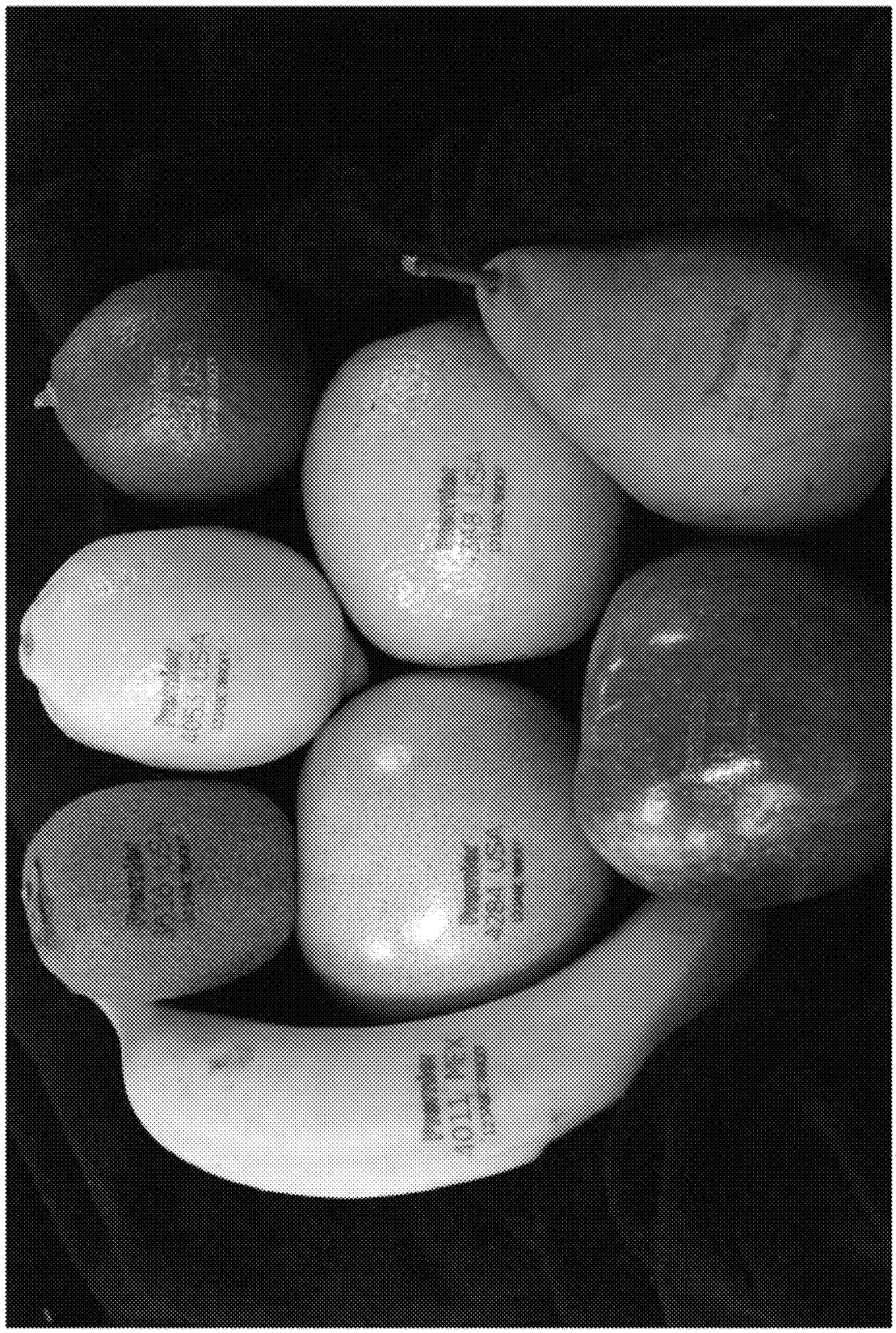

FIGS. 11-25 are photographs showing example aspects of the industrial environment of FIG. 1, according to an example implementation. FIG. 11 shows an in-process production run of grapefruit, as the grapefruit are being conveyed by rollers (e.g., at a sorting and/or quality control step, such as step 112 in FIG. 1). FIG. 12 is a further view of the production run of FIG. 11, showing a transfer of the grapefruit from a first roller conveyor, travelling in a first direction, to a second roller conveyor, travelling in a second direction orthogonal to the first direction. FIG. 13 is a further view of the production run of FIG. 11, showing a transition between the second roller conveyor and a first plurality of six guides, in a step referred to as "singulation" (e.g., at step 114 in FIG. 1), to cause arrangement of the grapefruit into single-file rows. FIG. 14 is a further view of the production run of FIG. 11, showing a transition between the first plurality of guides and a second plurality of six guides, the second plurality of guides being lined with brushes for the removal of any remaining surface debris from the grapefruit prior to their transport into the sizer (the sizer being visible at the righthand side of FIG. 14). FIG. 15 is a further view of the production run of FIG. 11, showing the top of a sizer (e.g., sizer 118 of FIG. 1) on the left, and grapefruit being conveyed out of the sizer, in a rightward direction. Following exit from the sizer, the grapefruit were transferred from the second plurality of guides to six lanes of single-file cups, with one orange positioned in each cup (as can be seen in the righthand side of FIG. 15). FIG. 16 is a further view of the production run of FIG. 11, showing a region of the cup lanes that is lined with brushes, prior to the labeller section. FIGS. 17 and 18 are detail views of the brushed cup lanes. FIG. 19 is a further view of the production run of FIG. 11, showing a labeller section with multiple labellers (e.g., labellers 120 of FIG. 1) across all six cup lanes, prior to the laser marking section. FIG. 20 is a further view of the production run of FIG. 11, showing an exit side of a laser marking section (e.g., laser marker 122 of FIG. 1) with a laser disposed above each of the six cup lanes, and grapefruit being conveyed therebeneath. FIG. 21 shows an entry side of the laser marking section, with the single/common master controller (box on the right) and the laser power supplies for each of the six lasers visible. FIG. 22 is a further view of the production run of FIG. 11, showing the grapefruit, post-labelling and/or laser marking, being diverted/distributed/redirected to packing locations located alongside the conveyor lanes (see top of FIG. 22). FIG. 23 is a detail view of the exit side of the laser marking section, showing (in sequence, from left to right) a colorant applicator (e.g., colorant applicator 124 of FIG. 1), a blow-off station and a wax applicator (e.g., wax applicator 126 of FIG. 1). FIG. 24 shows an individual packing location, with grapefruit that have accumulated as a result of the production run. As shown in FIG. 24, the packing location is marked with a sign that reads "$2^{nd}$ Grade." Since (1) the sizer shown in FIGS. 14-15 is configured to detect a grade of each orange as it passes through the sizer, (2) the sizer transmits the detected grade information to the labellers (shown in FIGS. 16 and 19) and/or to the laser markers (shown in FIGS. 20-21 and 23), (3) the labellers can be instructed to apply physical adhesive stickers to the grapefruit based on the detected grade information, (4) the laser markers can be instructed or configured to apply laser markings to the grapefruit based on the detected grade information, and (5) an operator can control the overall production run to specify how different types/grades of the grapefruit are to be distributed (e.g., via which drop locations) to each of multiple packing locations, the individual packing location shown in FIG. 24 can be automatically supplied with only "$2^{nd}$ Grade" grapefruit as a result of the production run illustrated by FIGS. 11-24.

FIGS. 25-28 are photographs showing examples of marked food products that can be produced using lasing/ marking systems and/or methods of the present disclosure, in accordance with some embodiments. FIG. 29 is an illustration of example marked food products that can be produced using lasing systems and/or methods of the present disclosure, in accordance with some embodiments.

FIG. 30 is an illustration showing a cross-sectional view of a transfer cup holding an orange and a side elevational view of a laser head compatible for use in lasing/marking systems of the present disclosure, according to some embodiments. As shown in FIG. 30, the orange 3124 (or other product, having a size up to the larger outline marked 3124) is disposed within cup 3142, and a laser 3132 of a laser marker 3128 is disposed above the orange during a laser marking operation.

Figure 31A:
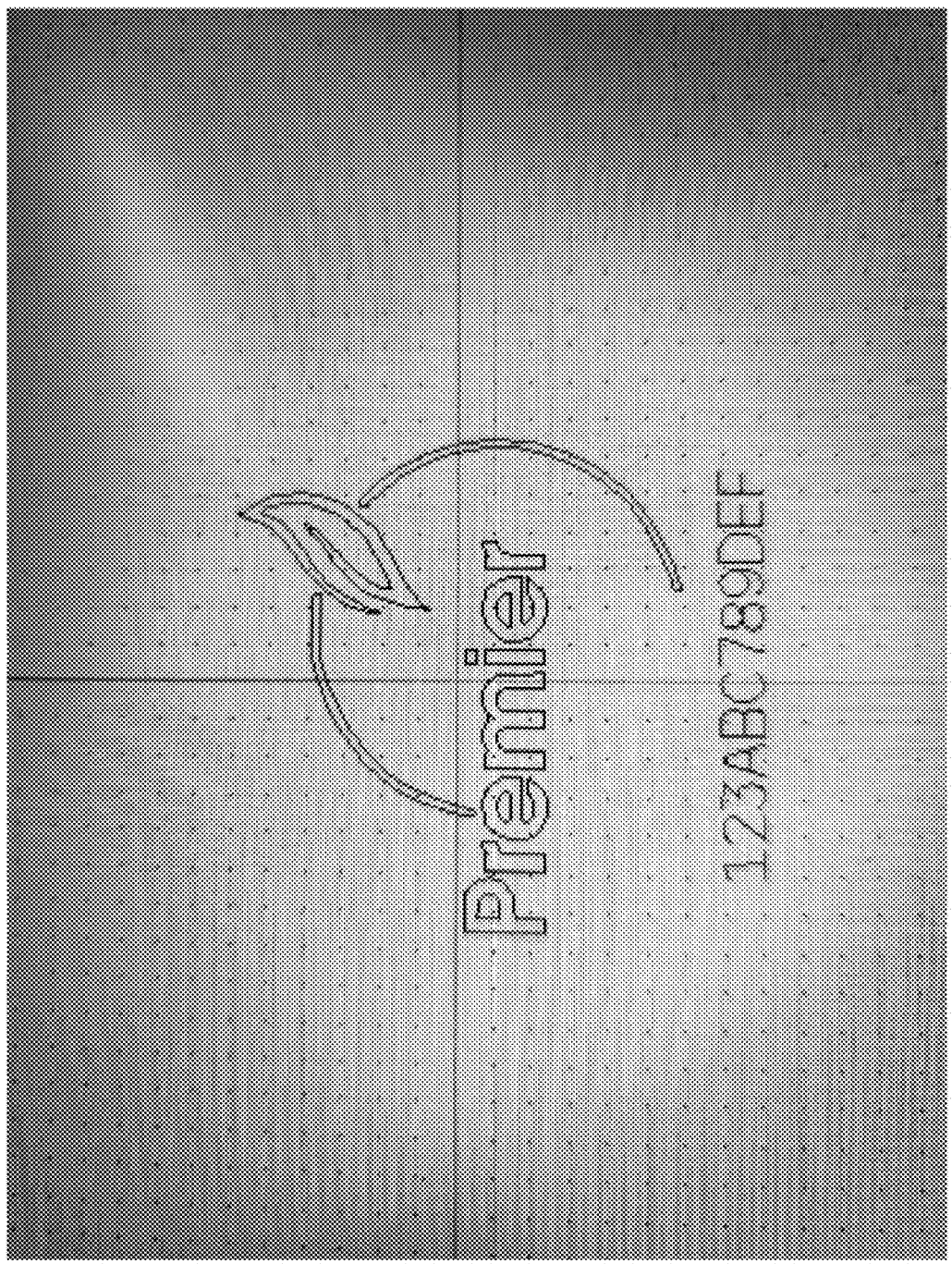
FIG. 31A is a screenshot of a GUI showing a user-defined marking pattern/design that can be applied using a lasing/marking system and/or method of the present disclosure, in accordance with some embodiments.

FIG. 31A is a screenshot of a GUI showing a user-defined marking pattern/design that can be applied using a lasing/marking system and/or method of the present disclosure, in accordance with some embodiments. As shown in FIG. 31A, the marking pattern/design includes plain text, block lettering, and graphical shapes, arranged/aligned within a grid.

Figure 31B:
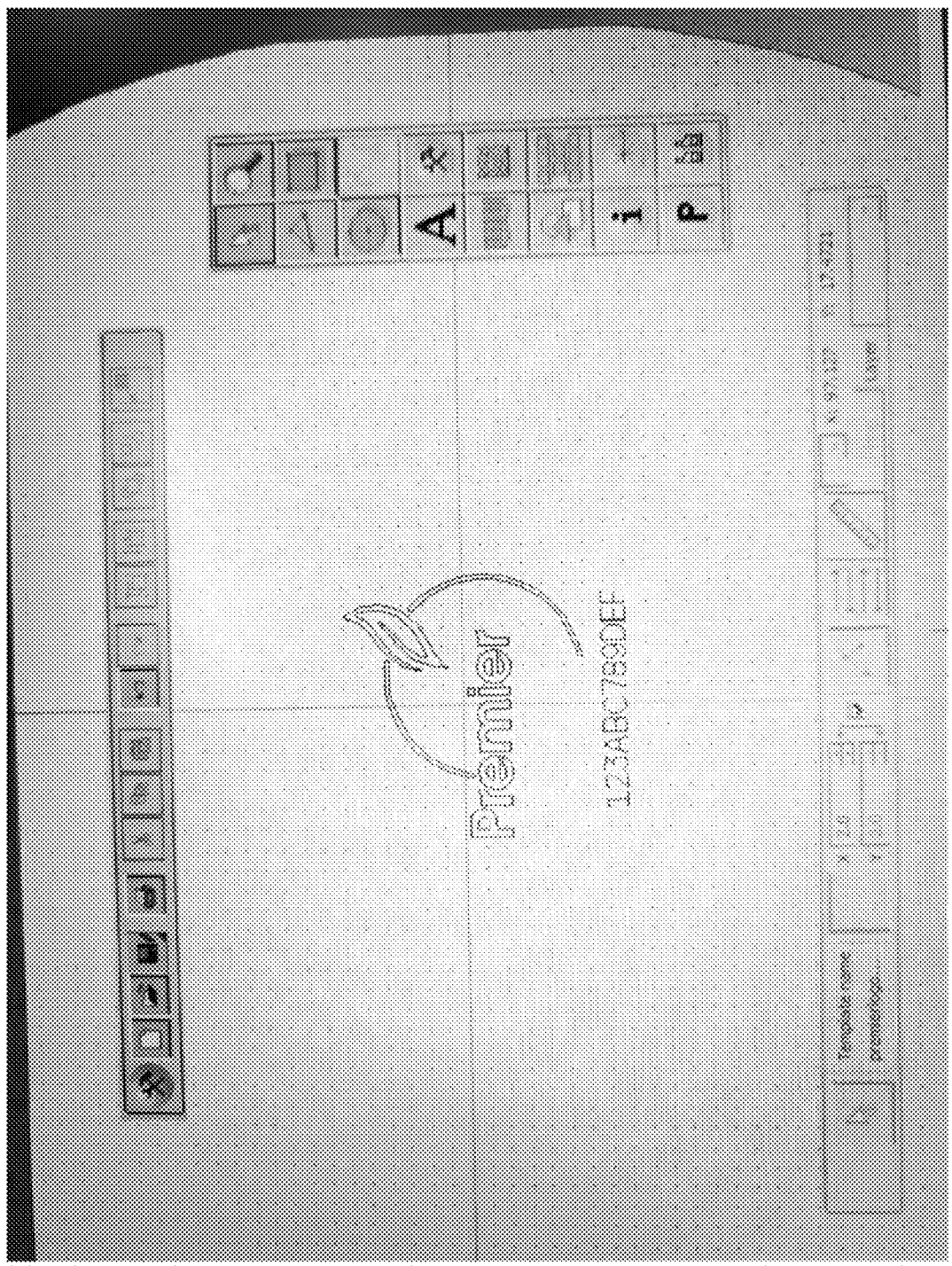
FIG. 31B is another view of the GUI and user-defined marking pattern/design of FIG. 31A, with navigation objects, drawing objects, and template information shown.

FIG. 31B is another view of the GUI and user-defined marking pattern/design of FIG. 31A, with navigation and drawing objects, and template information shown. The navigation and drawing objects include a tools button, a new file button, a file open button, a save button, a print button, a clip/cut object, a copy button, an undo action button, a redo action button, crop buttons, a "bring to front" button, a "send to rear" button, a magnifier button, a pointer button, a textbox insertion button, and shape drawing buttons (e.g., triangular region, circular region, shape selection).

Figure 31C:
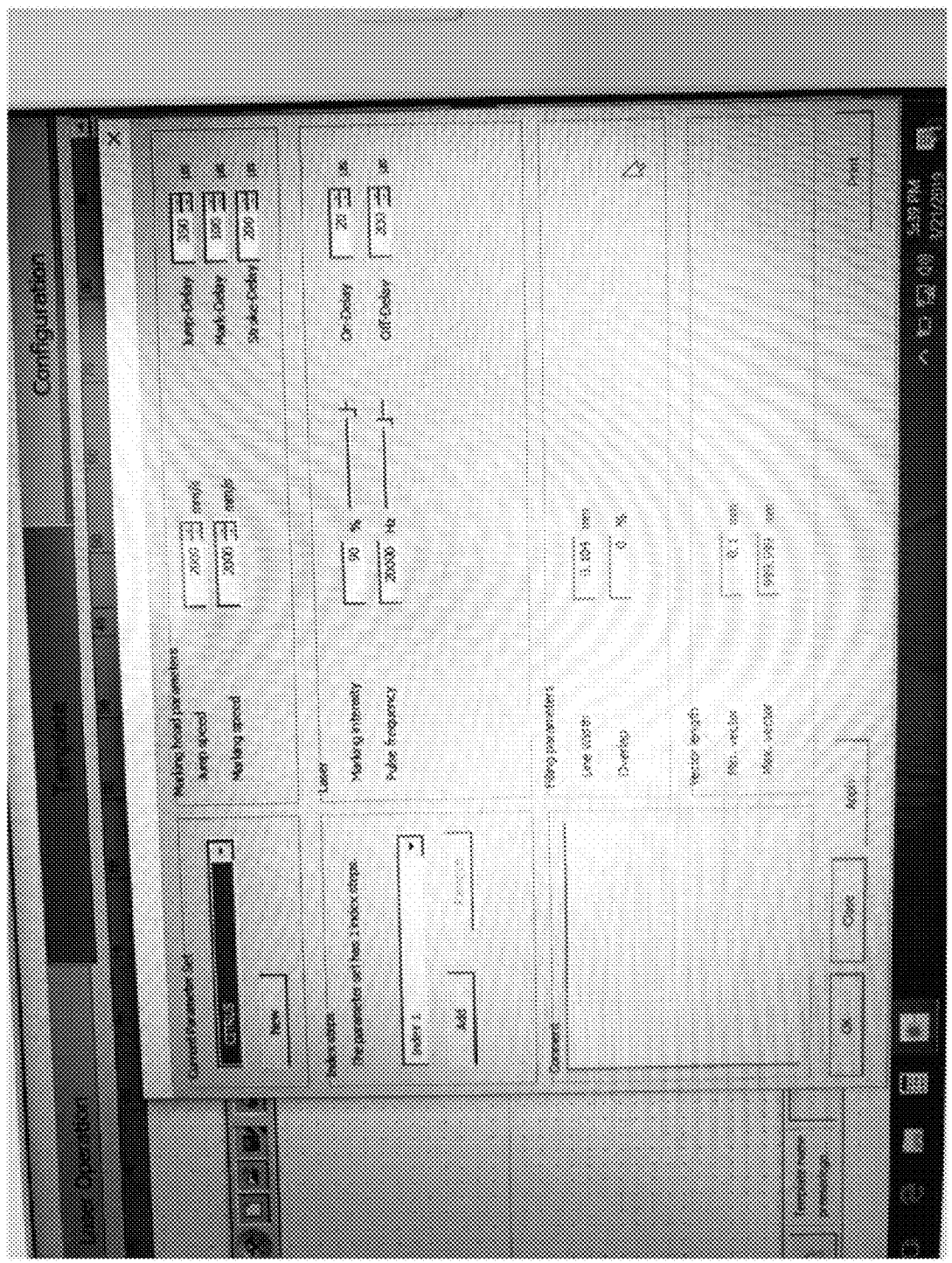
FIG. 31C is a screenshot of the GUI of FIG. 31A, showing user-selectable parameters of a parameter set associated with the template of FIG. 31B.

FIG. 31C is a screenshot of the GUI of FIG. 31A, showing user-selectable parameters of a parameter set associated with the template of FIG. 31B. As shown in FIG. 31C, parameters for a "current parameter" (in this example, "CITRUS"), the following can be defined and/or selected via the GUI: index shape, marking head parameters (e.g., jump speed, marking speed, jump delay, mark delay, and stroke delay), marking intensity, pulse frequency, on delay (e.g., in us), off delay (e.g., in us), filling parameters (e.g., line width, overlap), and vector length (e.g., minimum vector length and maximum vector length).

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EE- PROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, the term "plurality" refers to more than one (i.e., two or more) of the subject/noun being modified. For example, a "plurality of processors" refers to two or more processors.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. An apparatus, comprising:
a processor; and
a memory in operable communication with the processor, the memory storing instructions to cause the processor to:
send, to each laser from a plurality of lasers, an associated instruction set from a plurality of instruction sets, each instruction set from the plurality of instruction sets including instructions to laser etch a predetermined pattern onto food product when the food product is conveyed by applying laser energy to a skin of the food product, at a targeted penetration depth of the skin of the food product, such that the laser energy causes removal of pigment from the skin of the food product;
receive, from at least one industrial component, a signal encoding an operational deviation associated with a conveyor, the at least one industrial component including at least one of: a mechanical sizer, a grader, or a sorter;
generate, for at least one instruction set from the plurality of instruction sets and in response to receiving the signal encoding the operational deviation, a modified instruction set based on the operational deviation; and
send, to at least one laser from the plurality of lasers and during operation of the plurality of lasers, and via a communications network, the modified instruction set, such that at least one lasing parameter of that laser is adjusted.

2. The apparatus of claim 1, further comprising receiving a plurality of measurement signals including a measurement associated with one of a conveyor line speed, a laser fire timing, or a chain stretch.

3. The apparatus of claim 1, wherein the plurality of instruction sets is a first plurality of instruction sets, the memory further storing instructions to cause the processor to:
receive, via a GUI of the processor, a request to modify the predetermined pattern;
generate a second plurality of instruction sets based on the request to modify the predetermined pattern; and
send, to each laser from the plurality of lasers, an associated instruction set from the second plurality of instruction sets, each instruction set from the second plurality of instruction sets including instructions to laser etch a modified pattern onto food product when the food product is conveyed.

4. The apparatus of claim 1, wherein each laser from the plurality of lasers is positioned adjacent to a common conveyor lane.

5. The apparatus of claim 1, further comprising receiving a plurality of measurement signals associated with a plurality of conveyors including the conveyor, and each laser from the plurality of lasers is positioned adjacent to a different conveyor from the plurality of conveyors.

6. The apparatus of claim 1, wherein a first instruction set from the plurality of instruction sets has a first language, and a second instruction set from the plurality of instruction sets has a second language different from the first language.

7. The apparatus of claim 1, wherein the memory further stores instructions to cause the processor to select the targeted penetration depth from a plurality of penetration depths based on a thickness of the skin of the food product.

8. A non-transitory, processor-readable medium storing instructions to:
send, to each laser from a plurality of lasers, an associated instruction set from a plurality of instruction sets, each instruction set from the plurality of instruction sets including instructions to laser etch a predetermined pattern onto food product when the food product is conveyed by applying laser energy to a skin of the food product, at a targeted penetration depth of the skin of the food product, such that the laser energy causes removal of pigment from the skin of the food product;
receive, from at least one industrial component, a signal encoding an operational deviation associated with a conveyor, the at least one industrial component including at least one of: a mechanical sizer, a grader, or a sorter;
generate, for at least one instruction set from the plurality of instruction sets and in response to receiving the signal encoding the operational deviation, a modified instruction set based on the operational deviation; and
send, to at least one laser from the plurality of lasers and during operation of the plurality of lasers, and via a communications network, the modified instruction set, such that at least one lasing parameter of that laser is adjusted.

9. The non-transitory, processor-readable medium of claim 8, further storing instructions to receive a plurality of measurement signals including a measurement associated with one of a conveyor line speed, a laser fire timing, or a chain stretch.

10. The non-transitory, processor-readable medium of claim 8, wherein the plurality of instruction sets is a first plurality of instruction sets, the non-transitory, processor-readable medium further storing instructions to:
receive, via a GUI of the processor, a request to modify the predetermined pattern;
generate a second plurality of instruction sets based on the request to modify the predetermined pattern; and
send, to each laser from the plurality of lasers, an associated instruction set from the second plurality of instruction sets, each instruction set from the second plurality of instruction sets including instructions to laser etch a modified pattern onto food product when the food product is conveyed.

11. The non-transitory, processor-readable medium of claim 8, wherein each laser from the plurality of lasers is positioned adjacent to a common conveyor lane.

12. The non-transitory, processor-readable medium of claim 8, further storing instructions to receive a plurality of measurement signals associated with a plurality of conveyors, each laser from the plurality of lasers being positioned adjacent to a different conveyor from the plurality of conveyors.

13. The non-transitory, processor-readable medium of claim 8, wherein a first instruction set from the plurality of instruction sets has a first language, and a second instruction set from the plurality of instruction sets has a second language different from the first language.

14. A system, comprising:
a controller including a processor and a memory in operable communication with the processor;
a plurality of lasers in network communication with the controller, each laser from the plurality of lasers associated with a conveyor; and
at least one industrial component, including at least one of: a mechanical sizer, a grader, or a sorter,
the controller configured to:
send (1) a first instruction set to a first laser from the plurality of lasers, and (2) a second instruction set, to a second laser from the plurality of lasers;
receive, from the at least one industrial component, a signal encoding an operational deviation associated with the conveyor;
generate a modified instruction set based on the operational deviation; and
send the modified instruction to at least one of the first laser or the second laser via a communications network,
the first laser configured to apply, during operation and based on the first instruction set, a marking to a first food product as the first food product is conveyed, by applying laser energy to a skin of the food product, at a targeted penetration depth of the skin of the food product, such that the laser energy causes removal of pigment from the skin of the food product, and
the second laser configured to apply, during operation and based on the second instruction set, a marking to a second food product as the second food product is conveyed.

15. The system of claim 14, wherein the modified instruction set is sent to the first laser with a transmission time of between 35 microseconds and 53 microseconds.

16. The system of claim 14, wherein a conveyance speed of the first product during operation of the first laser is different from a conveyance speed of the second product during operation of the second laser.

17. The system of claim 14, wherein the first instruction set includes an indication of at least one of: a font size of the marking, a font type of the marking, or a graphic vector property.

18. The system of claim 17, wherein the modified instruction set includes at least one of: an indication of a font size of the marking different from the indication of the font size of the marking of the first instruction set, an indication of a font type of the marking different from the indication of the font type of the marking of the first instruction set, or an indication of a graphic vector property different from the indication of the graphic vector property of the first instruction set.

19. The system of claim 14, wherein at least one of the first laser or the second laser is configured to apply markings to food products at a rate of at least about 8 food products per second.

* * * * *